US011087081B1

(12) United States Patent
Srivastava et al.

(10) Patent No.: US 11,087,081 B1
(45) Date of Patent: Aug. 10, 2021

(54) SYNTHETIC DOCUMENT GENERATOR

(71) Applicant: Amazon Technologies, Inc., Seattle, WA (US)

(72) Inventors: Amulya Srivastava, Seattle, WA (US); Vivek Bhadauria, Redmond, WA (US); Gowtham Jeyabalan, Seattle, WA (US); Paul H. Kang, Seattle, WA (US); Mohammed El Hamalawi, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 16/359,930

(22) Filed: Mar. 20, 2019

(51) Int. Cl.

| | |
|---|---|
| ***G06F 40/00*** | (2020.01) |
| ***G06F 40/186*** | (2020.01) |
| ***G06N 3/04*** | (2006.01) |
| ***G06N 20/00*** | (2019.01) |
| ***G06F 40/117*** | (2020.01) |
| ***G06F 40/169*** | (2020.01) |

(52) U.S. Cl.
CPC .......... *G06F 40/186* (2020.01); *G06F 40/117* (2020.01); *G06F 40/169* (2020.01); *G06N 3/0445* (2013.01); *G06N 20/00* (2019.01)

(58) Field of Classification Search
CPC .... G06F 40/186; G06F 40/117; G06F 40/169; G06N 20/00; G06N 3/0445
See application file for complete search history.

(56) References Cited

U.S. PATENT DOCUMENTS 8,533,148 B1 * 9/2013 Feuersanger .......... G06N 20/00 706/62
8,620,842 B1 * 12/2013 Cormack ............... G06N 20/00 706/12

(Continued)

OTHER PUBLICATIONS

Ho, T.K. et al., "Evaluation of OCR Accuracy Using Synthetic Data," Proceedings of the 4th Annual Symposium on Document Analysis and Information Retrieval, Apr. 24-26, 1995, pp. 413-422.*

(Continued)

*Primary Examiner* — William L Bashore
*Assistant Examiner* — David Faber
(74) *Attorney, Agent, or Firm* — Robert C. Kowert; Kowert, Hood, Munyon, Rankin & Goetzel, P.C.

(57) ABSTRACT

A synthetic document generator that obtains a configuration for a synthetic document derived from real-world documents. The configuration specifies element templates to be included in the synthetic document and weights for the specified element templates. The system generates synthetic documents based on the configuration; the synthetic documents include diversified versions of the element templates specified in the configuration. Annotation documents are generated for the synthetic documents that include information describing the respective synthetic documents. A machine learning model for analyzing real-world documents can then be trained using the synthetic and annotation documents. Feedback from the analysis of real-world documents by the machine learning model can be used to generate a new configuration for generating additional synthetic and annotation documents which are used to further train the model.

20 Claims, 24 Drawing Sheets

(56) References Cited

U.S. PATENT DOCUMENTS

| | | | | |
|---|---|---|---|---|
| 8,805,766 | B2 * | 8/2014 | Ray | G06F 16/345 706/47 |
| 9,117,118 | B1 * | 8/2015 | Lewis | H04N 1/19594 |
| 9,208,232 | B1 * | 12/2015 | Tirumalareddy | G06F 16/951 |
| 10,452,700 | B1 * | 10/2019 | Truong | G06F 40/174 |
| 10,482,174 | B1 * | 11/2019 | Goodsitt | G06F 40/174 |
| 10,489,682 | B1 * | 11/2019 | Kumar | G06N 3/08 |
| 10,546,054 | B1 * | 1/2020 | Foroughi | G06F 16/287 |
| 2006/0059412 | A1 * | 3/2006 | Lefebvre | G06F 40/151 715/256 |
| 2006/0155530 | A1 * | 7/2006 | Altevogt | G06F 40/216 704/9 |
| 2009/0018990 | A1 * | 1/2009 | Moraleda | G06K 9/00483 |
| 2012/0095951 | A1 * | 4/2012 | Ray | G06N 5/025 706/47 |
| 2012/0259872 | A1 * | 10/2012 | Sengupta | G06F 16/9535 707/756 |
| 2014/0372346 | A1 * | 12/2014 | Phillipps | G06N 20/00 706/12 |
| 2016/0371262 | A1 * | 12/2016 | Cormack | G06F 16/23 |
| 2017/0017899 | A1 * | 1/2017 | Maor | G06F 16/2456 |
| 2017/0236059 | A1 * | 8/2017 | Lee | G16H 40/63 706/25 |
| 2018/0101791 | A1 * | 4/2018 | Viswanathan | G06N 20/00 |
| 2018/0268255 | A1 * | 9/2018 | Surazhsky | G06N 3/08 |
| 2019/0073348 | A1 * | 3/2019 | Cheesman | G06F 40/174 |
| 2019/0155894 | A1 * | 5/2019 | Gandhi | G06F 40/186 |
| 2019/0205322 | A1 * | 7/2019 | Dobrynin | G06F 40/186 |
| 2019/0213407 | A1 * | 7/2019 | Toivanen | G06N 7/005 |
| 2020/0125954 | A1 * | 4/2020 | Truong | G06F 16/35 |

OTHER PUBLICATIONS

Norvag et al, "Creating synthetic temporal document collections", 2004, 15 pages total.*

Kalogeratos et al, "Document clustering using synthetic cluster prototypes", Dec. 24, 2020, p. 284-306.*

Hitz et al, "Analysis of Synthetic Document Images", Aug. 6, 2020, 5 pages total.*

Capobianco et al, "DocEmul: a Toolkit to Generate Structured Historical Documents", Oct. 10, 2017, 6 pages total.*

Delalandre et al, "Generation of synthetic documents for performance evaluation of symbol recognition & spotting systems", May 8, 2010, p. 187-207.*

Journet et al, "DocCreator: A New Software for Creating Synthetic Ground-Truthed Document Images", Dec. 11, 2017, 17 pages.*

Strecker et al, "Automated Ground Truth Data Generation for Newspaper Document Images", 2009, IEEE, p. 1275-1279.*

Walker et al "A synthetic document image dataset for developing and evaluating historical document processing methods", Jan. 23, 2012, SPIE, 9 pages.*

* cited by examiner

330

```
"componentWeights": [
    {
      "name": "keyValuePair",
      "weight": 6
    },
    {
      "name": "checkbox",
      "weight": 1
    }
  ],
  "keyValueStyles": [
    {
      "name": "XformKeyAtTop",
      "weight": 1
    },
    {
      "name": "XformKeyAtBottom",
      "weight": 1
    }
  ],
  "isXformLikeForm": true,
  "numberOfSections": 1
```

```
{
  "textTypesAndWeights": [
    {
      "type": "numericSymbols",
      "weight": 5
    },
    {
      "type": "letters",
      "weight": 5
    },
    {
      "type": "punctuationSymbols",
      "weight": 4
    },
    {
      "type": "shortWords",
      "weight": 10
    },
    {
      "type": "longWords",
      "weight": 10
    },
    {
      "type": "regularWord",
      "weight": 10
    }
  ]
}
```

<header> 541

<section 1> 550

| <key> <value> 552A | <key> <value> 552B | <key> <value> <value>... 554A |
| | | <key> <value> <value>... 554B |

<key> <value> 552C

<key> <value> <value> <value> 554C | <key> <value> <value> <value>... 554D

<key> <value> <value> 554E

<key> <value> <value>...

<section 2> 570

<key> <value> <value>... 554F | <key> <clickable value> <clickable value> 556A

<key> <clickable value> <clickable value> 556B | <key> <clickable value> 556C

<key> <value> <value> <value>... 554G

<key> <value> <value>... 554H

<key> <value> <value> <value>... 554I | <key> <value> 552D

<key> <value> 552E

<text> 542

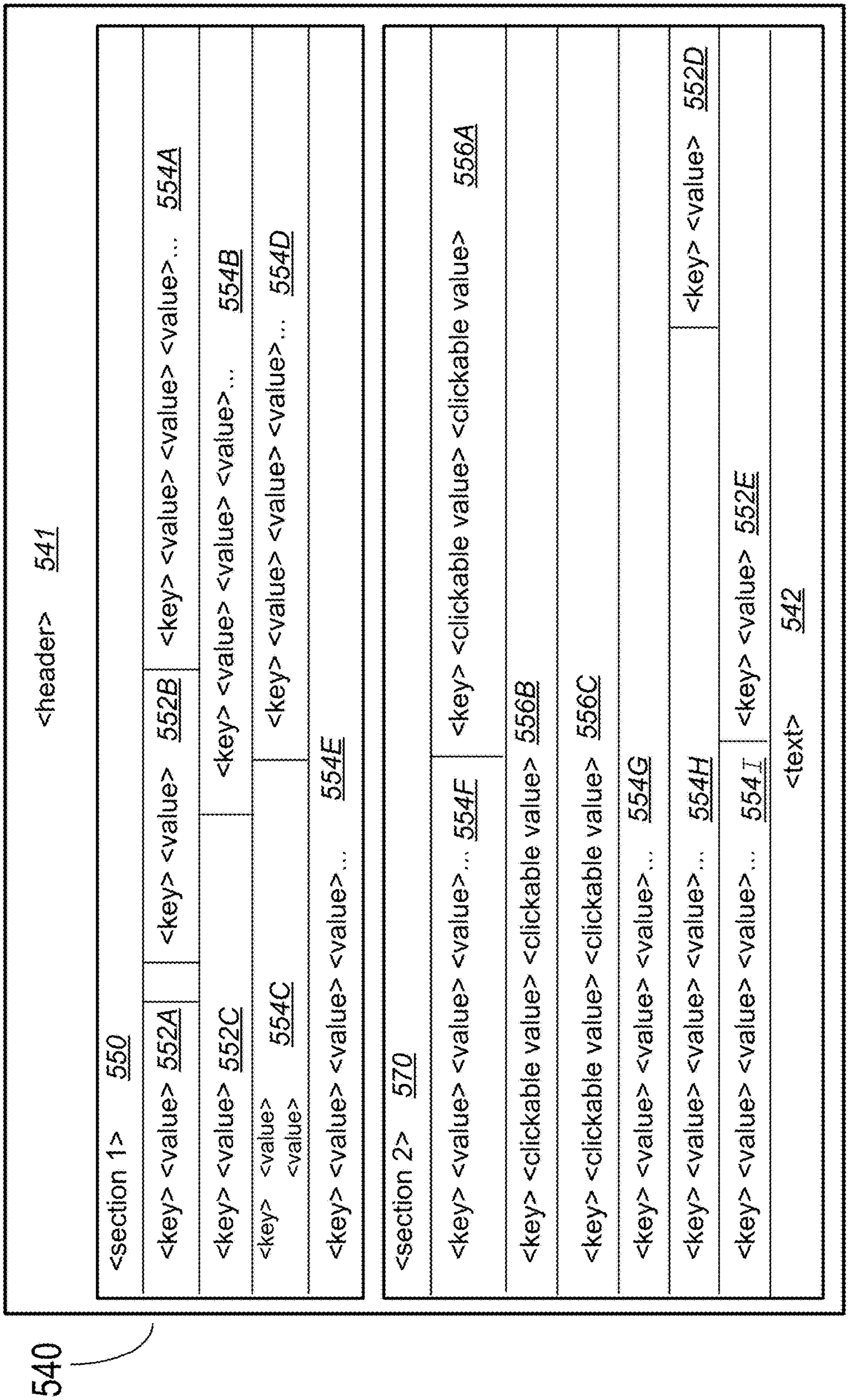

FIG. 5D

```
Tables {}
Key-Value pairs {}
Words {
      {
        <X,Y,W,H>
        <bounding box identifier 1>
        Transcriptions: [
           Content: <string 1>
           Style: <font size, type, and color>
           Transcription Type: Text
        ]
      },
      {
        <X,Y,W,H>
        <bounding box identifier 2>
        Transcriptions: [
           Content: <string 2>
           Style: <font size, type, and color>
           Transcription Type: Text
        ]
      },
...
}
Lines: {
       {
        Line Bounding Box: {
          <X,Y,W,H>
          <bounding box identifier n1>
        },
        Word Boxes: [
          <bounding box identifier 1>,
          <bounding box identifier 2>,
          ...
        ]
      },
      {
        Line Bounding Box: {
          <X,Y,W,H>
          <bounding box identifier n2>
        },
        Word Boxes: [
          <bounding box identifier m1>,
          <bounding box identifier m2>,
          ...
        ]
      },
...
}
```

word 1 word 2 line 1 words line 2 words

```
Sections{}
Text Bodies: {
      {
        <X,Y,W,H>
        <bounding box identifier x>
        Word Boxes: [
           <bounding box identifier y>
        ],
        Children: [
          {
            <bounding box identifier y>,
            Element Type: WORD
          }
        ]
      },
...
}
Headers: {
       {
        <X,Y,W,H>
        <bounding box identifier z>
        Word Boxes: [
           <bounding box identifier c1>
           <bounding box identifier c2>
           ...
        ],
        Children: [
          {
            <bounding box identifier c1>,
            Element Type: WORD
          },
          {
            <bounding box identifier c2>,
            Element Type: WORD
          },
          ...
        ]
      }
...
Form{}
Form body{}
}
```

*text body 1*

*header 1*

```
{
  Tables: { [] },
  Key-Value Pairs: {
      {
        Key: {
          <X,Y,W,H>
          <bounding box identifier a>
          Word Boxes: [
                 <bounding box identifier b1>
                 <bounding box identifier b2>
                 ...
          ]
        },
        Value: {
          <X,Y,W,H>
          <bounding box identifier c>
          Word boxes: [
            <bounding box identifier d>
          ],
          Children: [
            {
              Identifier: <bounding box identifier d>
              Element Type: <type of element>
            }
          ]
        },
        Values: [
          {
            <X,Y,W,H>
            <bounding box identifier c>,
            Word boxes: [
              <bounding box identifier d>
            ],
            Children: [
              {
                Identifier: <bounding box identifier d>
                Element Type: <type of element>
              }
            ]
          }
        ],
        Key-Value Container: {
          <X,Y,W,H>
          <bounding box identifier e>
        },
        StyleName: <style a> (Single Key-Single Value)
      },
```

key single value key-value element 1

```
      Key: {
        <X,Y,W,H>
        <bounding box identifier f>
        Word Boxes: [
              <bounding box identifier g1>
              <bounding box identifier g2>
              ...
        ]
      },
      Value: NULL
      Values: [
        {
          <X,Y,W,H>
          <bounding box identifier h>,
          Word boxes: [
            <bounding box identifier i>
          ],
          Children: [
            {
              Identifier: <bounding box identifier i>
              Element Type: <type of element>
            }
          ]
        }
      ],
       {
          <X,Y,W,H>
          <bounding box identifier j>,
          Word boxes: [
            <bounding box identifier k>
          ],
          Children: [
            {
              Identifier: <bounding box identifier k>
              Element Type: <type of element>
            }
          ]
        }
      ],
...

      Key-Value Container: {
        <X,Y,W,H>
        <bounding box identifier l>
      },
      Style Name: <style b> (Single Key-Multiple Value)
    },
```

key multi-values key-value element 2

```
Words {
       {
         <X,Y,W,H>
         <bounding box identifier m>
         Transcriptions: [
            Content: <string m>
            Style: <font size, type, and color>
            Transcription Type: Text
         ]
       },
      {
         <X,Y,W,H>
         <bounding box identifier n>
         Transcriptions: [
            Content: <string n>
            Style: <font size, type, and color>
            Transcription Type: Text
         ]
       },
...
      {
         <X,Y,W,H>
         <bounding box identifier o>
         Transcriptions: [
            Content: TRUE
            Transcription Type: Clickable Value
         ]
       },
      {
         <X,Y,W,H>
         <bounding box identifier p>
         Transcriptions: [
            Content: FALSE
            Transcription Type: Clickable Value
         ]
       },
...
}
```

word 1 word 2 word 3 word 4

```
Lines: {
        {
         Line Bounding Box: {
           <X,Y,W,H>
           <bounding box identifier q1>
         },
         Word Boxes: [
           <bounding box identifier m>,
           <bounding box identifier n>,
           ...
         ]
        },
       {
         Line Bounding Box: {
           <X,Y,W,H>
           <bounding box identifier q2>
         },
         Word Boxes: [
           <bounding box identifier o>,
           <bounding box identifier p>,
           ...
         ]
        },
...
}
Sections: {
        {
         Section Id: <bounding box identifier r1>
         Section: {
           <X,Y,W,H>
           <bounding box identifier r2>
         },
         Section Header: {
           <X,Y,W,H>
           <bounding box identifier r3>
         },
         Section Body: {
           <X,Y,W,H>
           <bounding box identifier r4>
           Word Boxes: [],
           Children: []
         }
        },
...
}
```

line 1 line 2 section 1

```
Text Bodies: {
      {
        <X,Y,W,H>
        <bounding box identifier s>
        Word Boxes: [
           <word bounding box identifier>
        ],
        Children: [
          {
            <word bounding box identifier>,
            Element Type: WORD
          }
         ...
        ]
      },
...
}
Headers: {
       {
        <X,Y,W,H>
        <bounding box identifier t>
        Word Boxes: [
           <word bounding box identifier>
           ...
        ],
        Children: [
          {
            <word bounding box identifier>,
            Element Type: WORD
          },
          ...
        }
...
}
```

text body 1 header 1

```
Form: {
     {
        <X,Y,W,H>
        <form bounding box identifier>
        Word Boxes: [],
        Children: [
          {
            <form body bounding box identifier>
            Element Type": FORM_BODY
          },
          {
            <section bounding box identifier>
            Element Type: SECTION
          },
          ...
          {
            <header bounding box identifier>
            Element Type: HEADER
          }
        ]
      }
    ]
  },
  Form Body: {
      {
        <X,Y,W,H>
        <form body bounding box identifier>
        Word Boxes: [],
        Children: [
          {
            <section bounding box identifier>
            Element Type: SECTION
          },
          ...
        ]
      }
    ]
  }
}
```

SYNTHETIC DOCUMENT GENERATOR

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

BRIEF DESCRIPTION OF THE DRAWINGS

FIG. 3 is an example configuration for a form document, according to some embodiments.

FIG. 4 is an example configuration for a text document, according to some embodiments.

FIGS. 5A through 5D show example synthetic documents, according to some embodiments.

FIGS. 6A and 6B shows an example annotation document for a dense text synthetic document, according to some embodiments.

FIGS. 7A through 7F show an example annotation document for a dense form synthetic document, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 10:
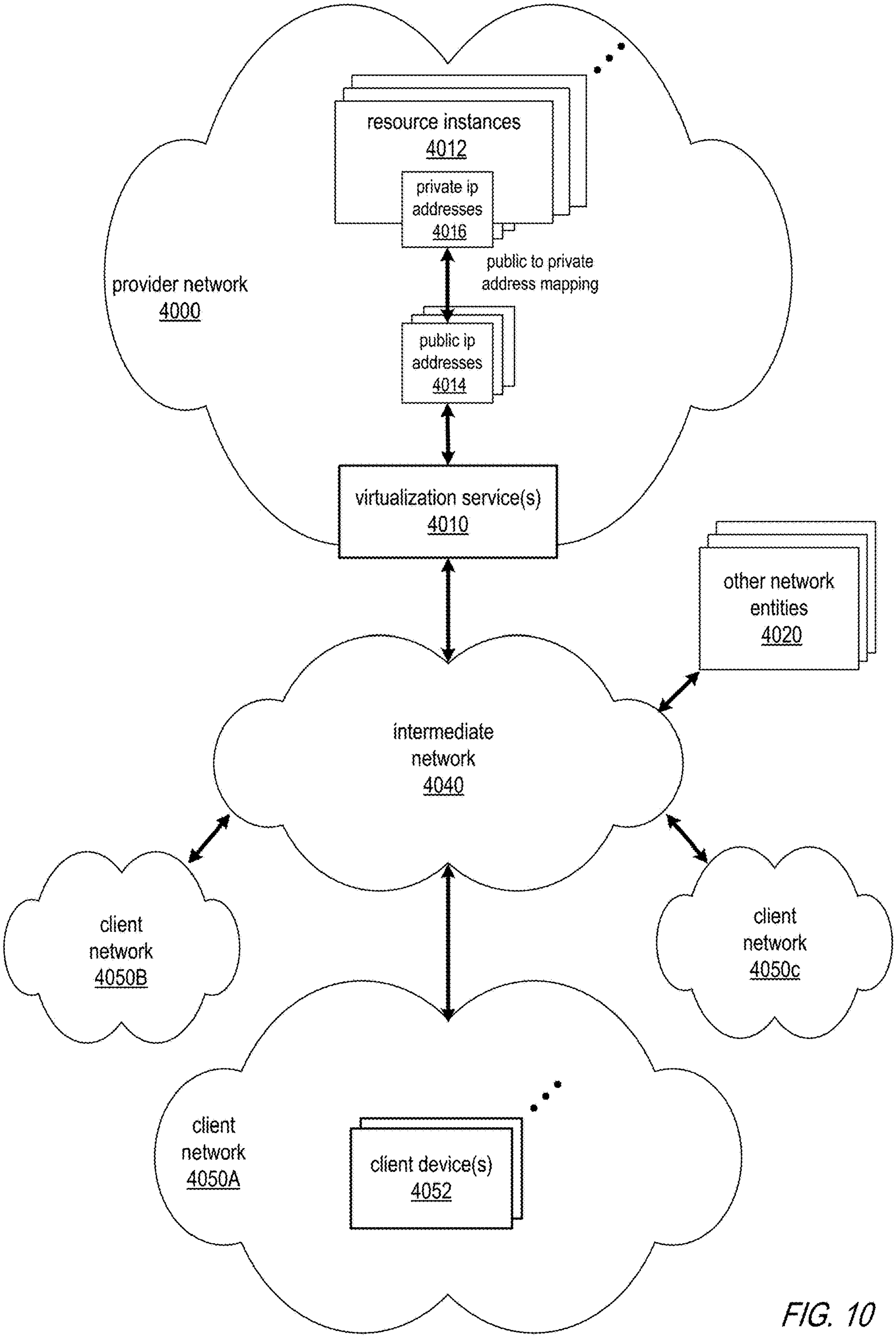
FIG. 10 illustrates an example provider network environment, according to some embodiments.

Various embodiments of methods and apparatus for generating configuration-controlled synthetic documents for training machine learning models such as neural networks are described. A document analysis service or system may analyze real-world documents such as forms, receipts, and dense text documents using machine learning models (e.g., neural networks) to generate digital and semantic information for the documents, for example as illustrated in FIG. 10. Machine learning models are trained and tested using ground truth data. For a machine learning model used by a document analysis system, the ground truth data describes the various elements which make up a given document. For example, form documents may contain key-value pairs, tables, text, headers, footers, and so on. As another example, text documents may contain headers, footers, columns or blocks of text, and so on.

Conventionally, machine learning models are trained and tested with large sets of real-world data. Conventionally, to train a machine learning model for a document analysis system, a large number of real-world documents are analyzed and annotated through human effort to provide a sufficiently large set of ground truth data. However, this conventional method has several problems that make it difficult to obtain a sufficient amount of quality ground truth data for training a machine learning model for document analysis. The amount of human effort this approach requires can make it a very expensive process. In addition, humans are prone to errors, and thus the quality of the ground truth data may be negatively impacted. Another difficulty is that many types of real-world documents include personal information, and thus privacy concerns may make it difficult to obtain a sufficient number of real-world documents for the training set.

In addition, an important requirement to train a machine learning model for document analysis well is diversity across documents. Diversity refers to the controlled presence of different types of document elements with different styles. For example, a scientist training a machine learning model for document analysis may only be looking for forms with tables and fill-in-the-blank style key-value pairs. Obtaining a sufficiently diverse set of real-world documents for training a machine learning model for document analysis is difficult when using the conventional method that involves humans analyzing and annotating the documents.

Embodiments of a synthetic document generation method and system are described that provide a configuration-driven approach that addresses these problems with conventional methods. The synthetic document generation system takes a configuration (e.g., a JSON (JavaScript Object Notation) file) specifying which elements must be present in a form or document (key-value pairs, tables, checkboxes, text, etc.).

The configuration may also specify whether or not the layout of the elements is structured (number of rows and columns), and which styles the elements should adhere to. In addition, a weight can be specified for each element to attain a weighted probabilistic distribution of element. For text documents, the configuration can be used to specify which types of text is needed (short words, long words, hyphenated words, punctuation symbols, numeric symbols, etc.). The configuration allows for the extraction of defining elements and features (style, layout, element composition, content, etc.) from real-world forms and replicating the elements and features in synthetic documents with the required diversity. From the configuration, the system can generate a large number of synthetic documents and corresponding annotation documents in a short period of time. Thus, the configuration-driven synthetic document generation method and system greatly simplifies the bulk generation of documents for training machine learning models.

In addition, in some embodiments, feedback from a machine learning model (e.g., a neural network) trained with the synthetic data can be automatically or manually analyzed to determine features or elements of the documents that the model performs poorly on. From this analysis, new configurations can be generated to generate additional synthetic training data that includes new synthetic and annotation documents to further train the model on the features or elements where the model underperforms. This process can be repeated to fine tune the machine learning model to perform better when analyzing real-world documents using a document analysis system.

Figure 8:
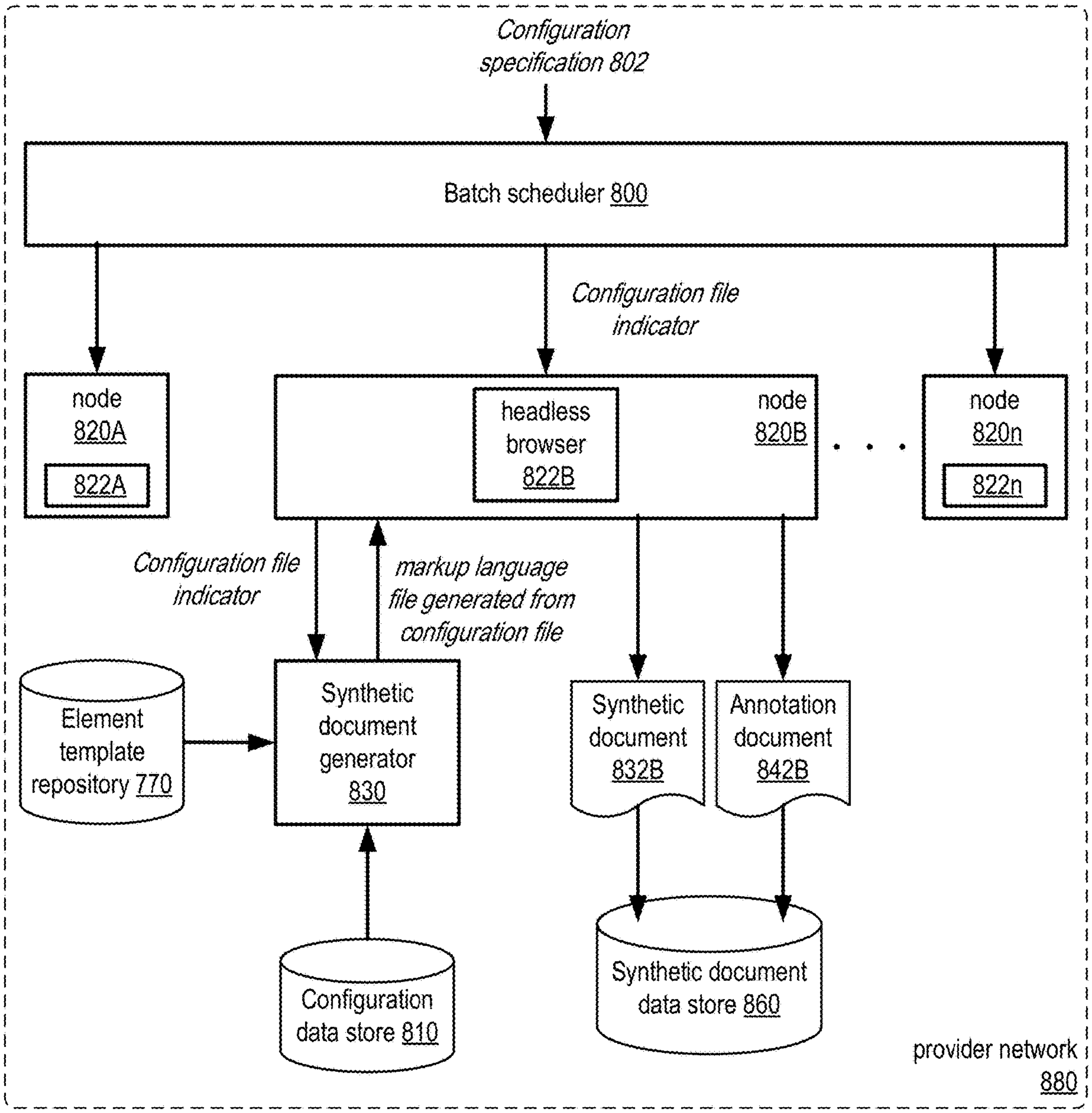
FIG. 8 illustrates an example cloud-based system for generating multiple synthetic documents, according to some embodiments.
Figure 9:
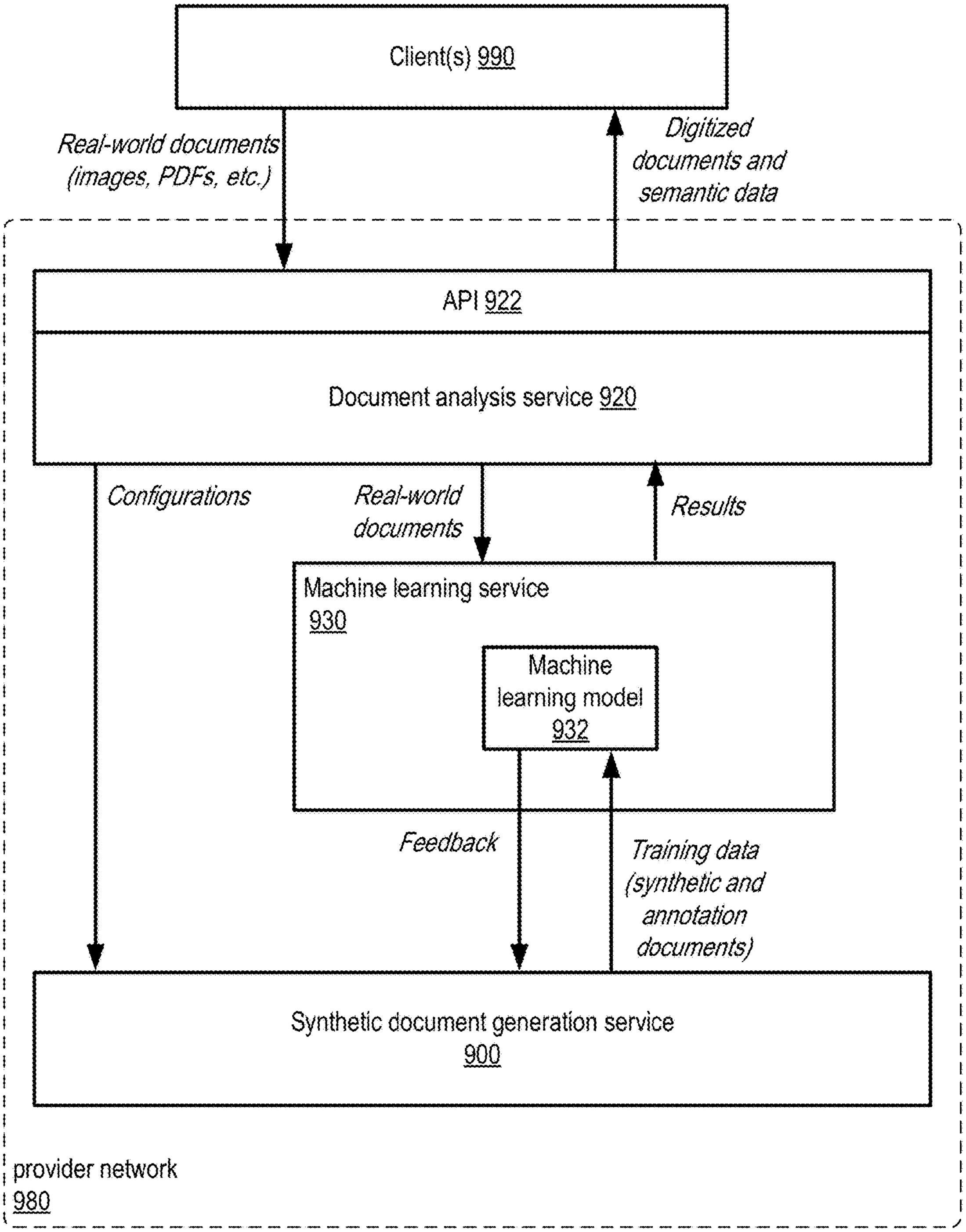
FIG. 9 illustrates an example cloud-based document analysis system, according to some embodiments.

Embodiments of the synthetic document generation system may, for example, be implemented as a service in a provider network. A document analysis service may also be provided on the provider network to analyze real-world documents using machine learning models trained by the synthetic document generation service. A provider network may, for example, be a network set up by an entity such as a company or a public sector organization to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the provider. Example provider network implementations of embodiments are illustrated in FIGS. 8 and 9. An example provider network in which embodiments may be implemented is illustrated in FIGS. 10 through 13.

Figure 1A:
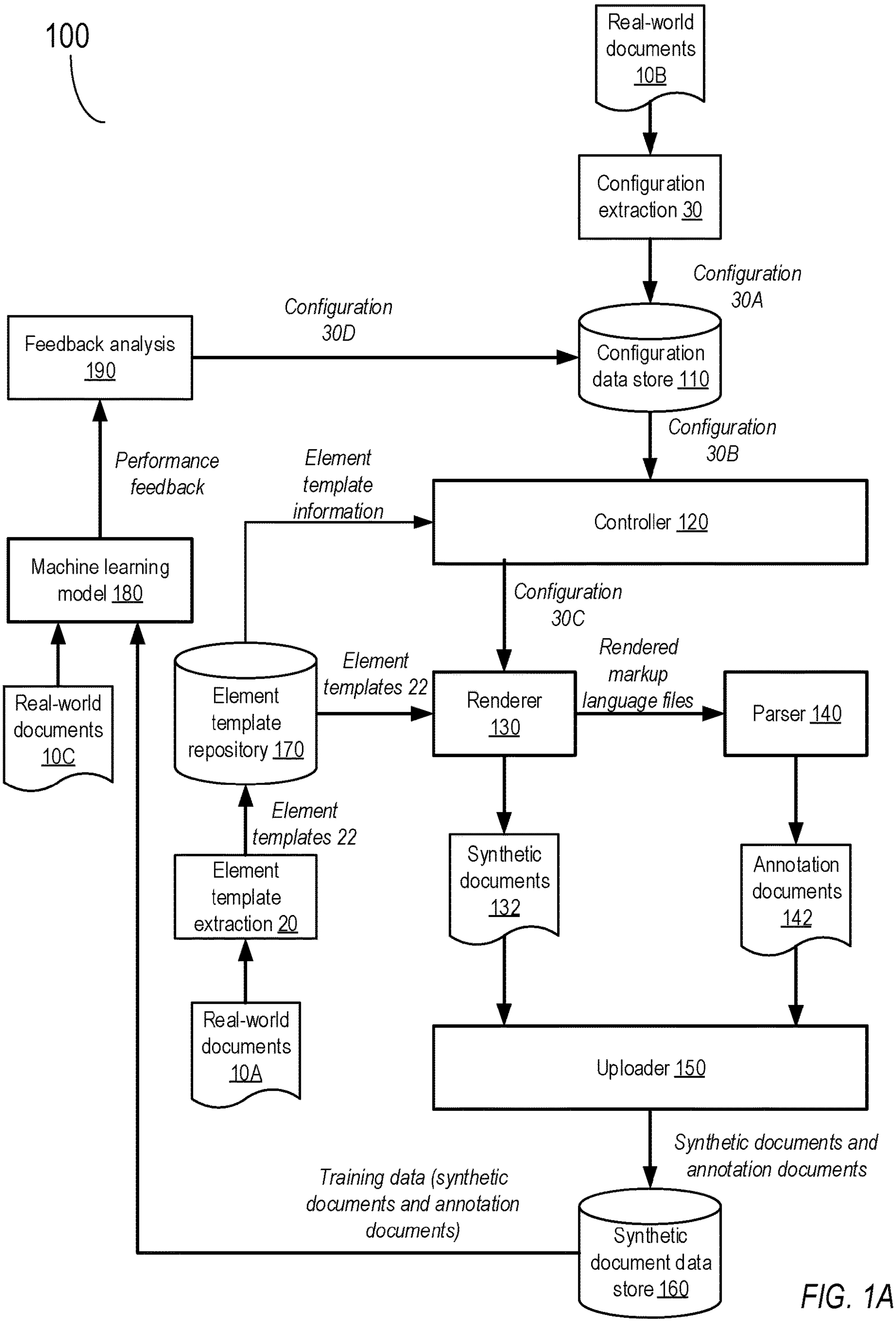
FIGS. 1A and 1B illustrate a synthetic document generation system, according to some embodiments.
Figure 1B:
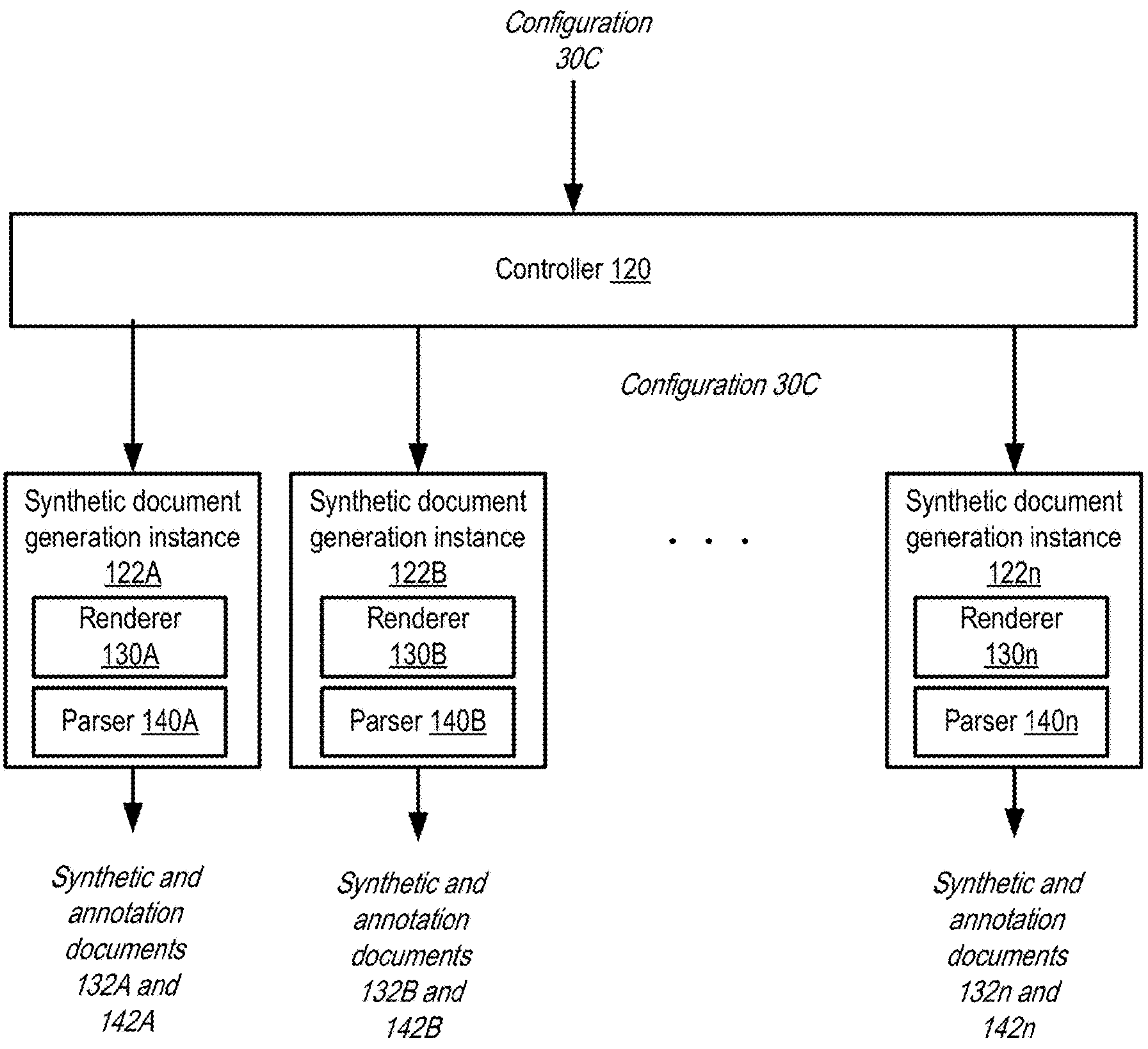

FIGS. 1A and 1B graphically illustrate a synthetic document generation system 100, according to some embodiments. As illustrated in FIG. 1A, in some embodiments, element templates 22 are extracted 20 from a set of real-world documents 10A; the extracted element templates 22 are stored in an element template repository 170. Each element template 22 represents a document element extracted from the set of real-world documents 10A. The extraction 20 process may be performed manually, automatically, or by a combination of manual and automated steps. In some embodiments, the element templates 22 may be stored in a repository 170, for example a data store on one or more storage devices, as markup language (e.g., Hypertext Markup Language (HTML)) components. The element templates 22 may be viewed as reusable building blocks that represent real-world document elements and that may be used to generate multiple, diverse synthetic documents.

General categories of document elements that may be extracted from real-world documents 10A and represented by element templates 22 in the repository 170 may include one or more of, but are not limited to, text elements (numeric symbols, letters, punctuation symbols, short words, long words, regular words, hyphenated words, etc.), key-value elements (single key-single value elements, single key-multiple value elements, key-clickable value elements (for example, checkboxes), etc.), tables, columns, headers, footers, sections (e.g., text sections), or in general any category of element that may be found in real-world documents 10A. Multiple types of element templates 22 may be generated for a category of document element, each type of element template 22 representing a different style, form, and/or size for an element in that category. The element templates 22 may be tagged with identifiers.

In some embodiments, a set of real-world documents 10B may be analyzed in a configuration extraction 30 process to generate a configuration 30A for generating synthetic documents based on the real-world documents 10B to train a machine learning model 180 (e.g., a neural network). Configuration extraction 30 may be a manual process, an automated process, or a combination of manual and automated steps. Configuration 30A may specify which elements should be present in the synthetic documents (key-value pairs, tables, text, etc.). Configuration 30A may also specify whether or not the layout of the elements is to be structured (e.g., number of rows and columns), and which styles the elements should adhere to. In addition, a weight may be specified for each element to attain a weighted probabilistic distribution of elements in the synthetic documents. For text documents (or for text portions of form documents), the configuration 30A can be used to specify which types of text elements are needed (short words, long words, hyphenated words, punctuation symbols, numeric symbols, etc.). In some embodiments, configuration 30A may be stored to a configuration data store 110 on one or more storage devices. In some embodiments, configuration 30A may be a JSON (JavaScript Object Notation) file. However, other methods may be used to specify a configuration 30A.

A controller 120 component, implemented on one or more computing devices, receives a configuration 30B, for example from configuration data store 110. Controller 120 analyzes the configuration 30B according to a set of rules to determine which types of element templates 22 should be used to generate the synthetic documents and generates a configuration 30C that indicates the types of element templates 22 and weights for the different types of element templates 22 based on the configuration 30B. In some embodiments, configuration 30C may be a JSON (JavaScript Object Notation) file. However, other methods may be used to specify a configuration 30C. FIGS. 3 and 4 illustrate example configuration 30C files.

Controller 120 passes the configuration 30C to a renderer component (e.g., renderer 130A, renderer 130B, or renderer 130*n*), implemented on one or more computing devices. The renderer generates a diverse set of markup language documents (e.g., HTML files) that include examples of the types of element templates 22 from repository 170 distributed according to the weights as indicated in the configuration 30C. Content, size, style, and location of the element templates 22 in the markup language documents may be randomized by the renderer to provide diversity in the synthetic documents. The renderer then renders the markup language documents (e.g., using a headless browser) to generate rendered markup language documents and captures images of the rendered markup language documents to generate the synthetic documents 132. FIGS. 5A through 5D illustrate examples of synthetic documents 132.

The renderer also passes the rendered markup language documents to a parser component (e.g., parser 140A, parser 140B, or parser 140*n*), implemented on one or more computing devices, which parses the rendered markup language documents to generate annotation documents 142 for the synthetic documents 132. In some embodiments, annotation documents 142 may be JSON (JavaScript Object Notation) files. However, other methods may be used to specify annotation documents 142. Each annotation document 142 includes information describing the respective synthetic document 132. For example, an annotation document may include information describing the element template 22 type, location, size, style, and content of the elements in the synthetic document 132, and also may include information indicating associations between elements in the synthetic document 132 (for example, which words are associated with a text element). FIGS. 6A and 6B illustrate an annotation document 142 for a text document, and FIGS. 7A through 7F illustrate an annotation document 142 for a form document.

An uploader 150 component, implemented on one or more computing devices, uploads the synthetic 132 and annotation 142 documents generated by the renderer and parser to a synthetic document data store 160 on one or more storage devices.

As indicated in FIG. 1A, the synthetic 132 and annotation 142 documents may be input to a machine learning model 180 (e.g., a neural network) as training data. Once trained with the synthetic 132 and annotation 142 documents, real-world documents 10C similar to the synthetic documents 132 may be analyzed by the machine learning model to classify elements in the real-world documents 10C.

In some embodiments, performance feedback from the machine learning model 180 may be received by a feedback analysis 190 process. Feedback analysis 190 may be a manual process, an automated process, or a combination of manual and automated steps. Feedback analysis 190 may determine one or more features or elements of the documents 10C that the model 180 performs poorly on. From this analysis, a new configuration 30D can be generated that may be used to generate additional synthetic training data that includes new synthetic and annotation documents to further train the model on the features or elements where the model 180 underperforms. This process can be repeated one or more times to fine tune the machine learning model 180 to perform better when analyzing real-world documents.

As shown in FIG. 1B, in some embodiments, synthetic document generation system 100 may include multiple synthetic document generation instances 122A and 122B-122*n*, for example implemented as virtual machine (VM) instances on a provider network. Each instance may implement an instance of the renderer and parser components. To generate multiple synthetic documents 132 and corresponding annotation documents 142 from a configuration 30C, the controller 120 distributes the configuration 30C to each of instances 122A-122*n*. The renderer and parser on each instance then generates a synthetic 132 and annotation 142 document based on the configuration 30C. The synthetic document generation instances 122A-122*n* thus generate synthetic documents 132A and 132B-132*n* and corresponding annotation documents 142A and 142B-142*n*. For example, if there are 1000 synthetic document generation instances, then 1000 synthetic documents 132 and 1000 corresponding annotation documents 142 will be produced.

FIGS. 2A through 2D are flowcharts of a method for generating synthetic documents, according to some embodiments.

Figure 2A:
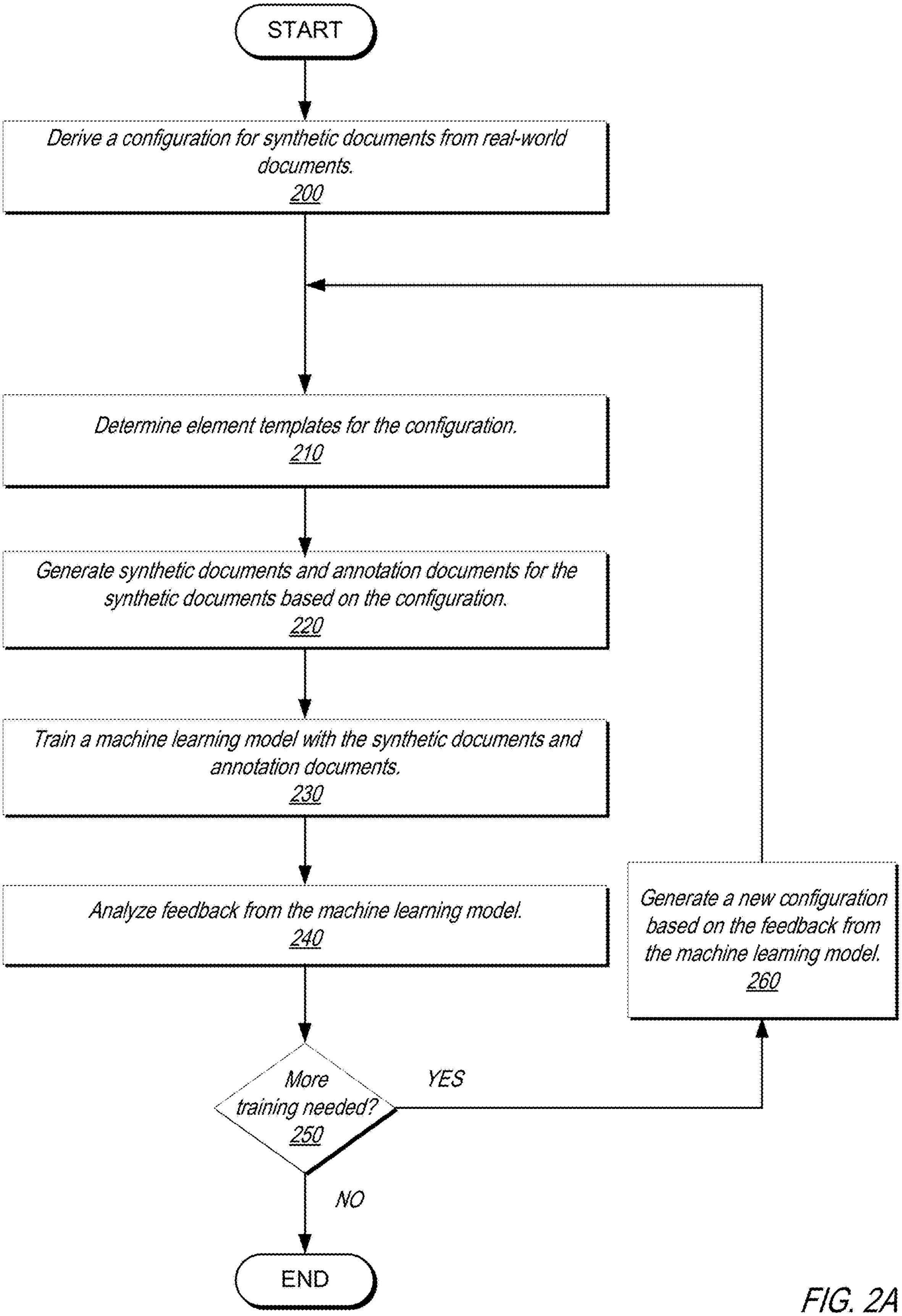
FIGS. 2A through 2C are flowcharts of a method for generating synthetic documents, according to some embodiments.

FIG. 2A is a high-level flowchart of a method for generating synthetic documents for training a neural network, according to some embodiments. As indicated at 200, a configuration for synthetic documents is derived from real-world documents. The configuration may specify which elements should be present in the synthetic documents (key-value pairs, tables, text, etc.). The configuration may also specify whether or not the layout of the elements is to be structured (e.g., number of rows and columns), and which styles the elements should adhere to. In addition, a weight may be specified for each element to attain a weighted probabilistic distribution of elements in the synthetic documents.

As indicated at 210, element template types, styles, and layouts for the synthetic documents are determined for the configuration. In some embodiments, a controller receives the configuration that was derived from real-world documents at 200, analyzes the configuration according to a set of rules to determine which types of element templates should be used to generate the synthetic documents, and generates a configuration file (e.g., a JSON file) that indicates the types of element templates and weights for the different types of element templates based on the received configuration. In some embodiments, the element templates referenced in the configuration file are reusable element templates (e.g., HTML components) that were extracted from a set of real-world documents and stored in an element template repository. FIGS. 3 and 4 illustrate example configuration 30C files.

Figure 2B:
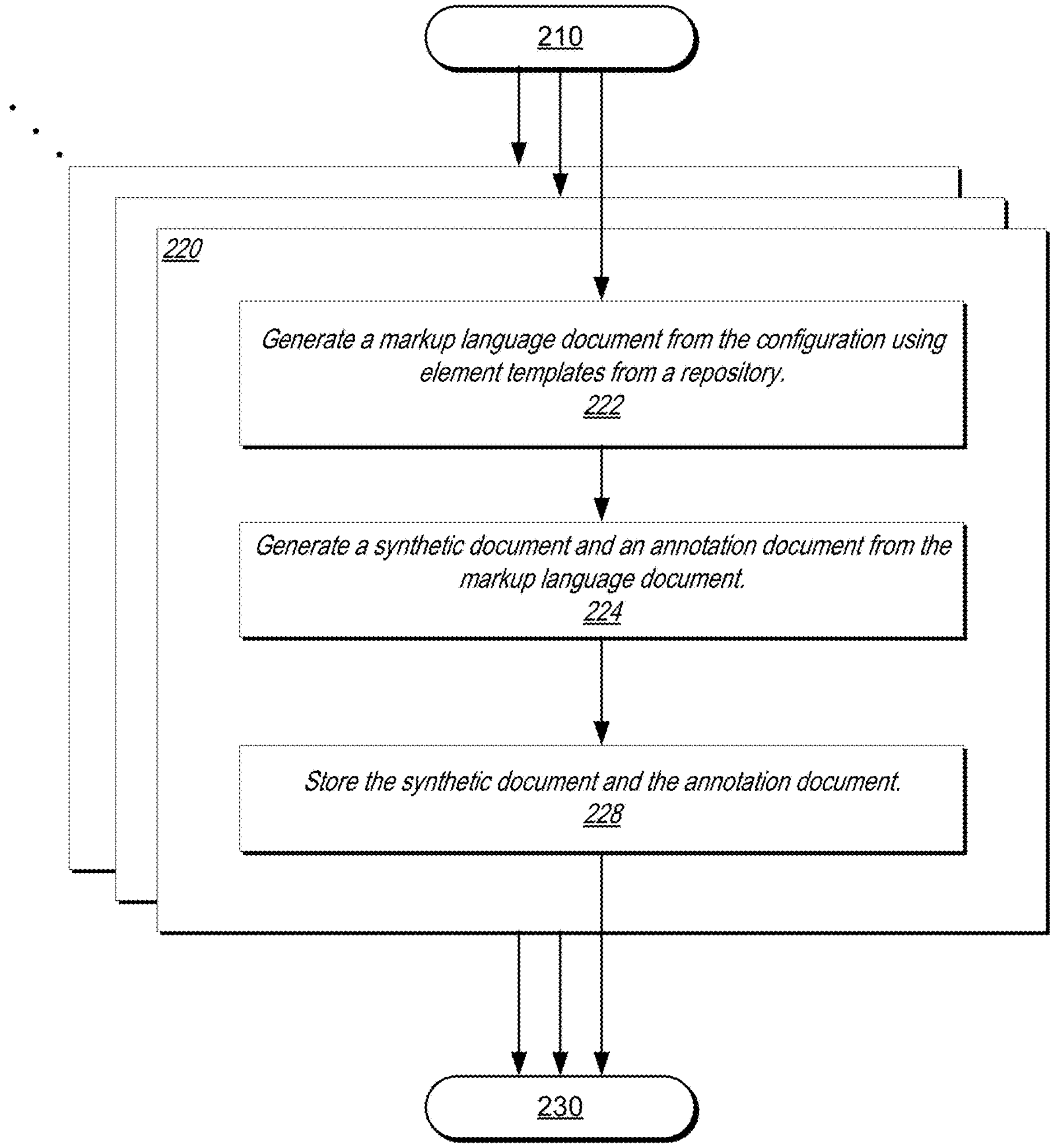
Figure 2C:
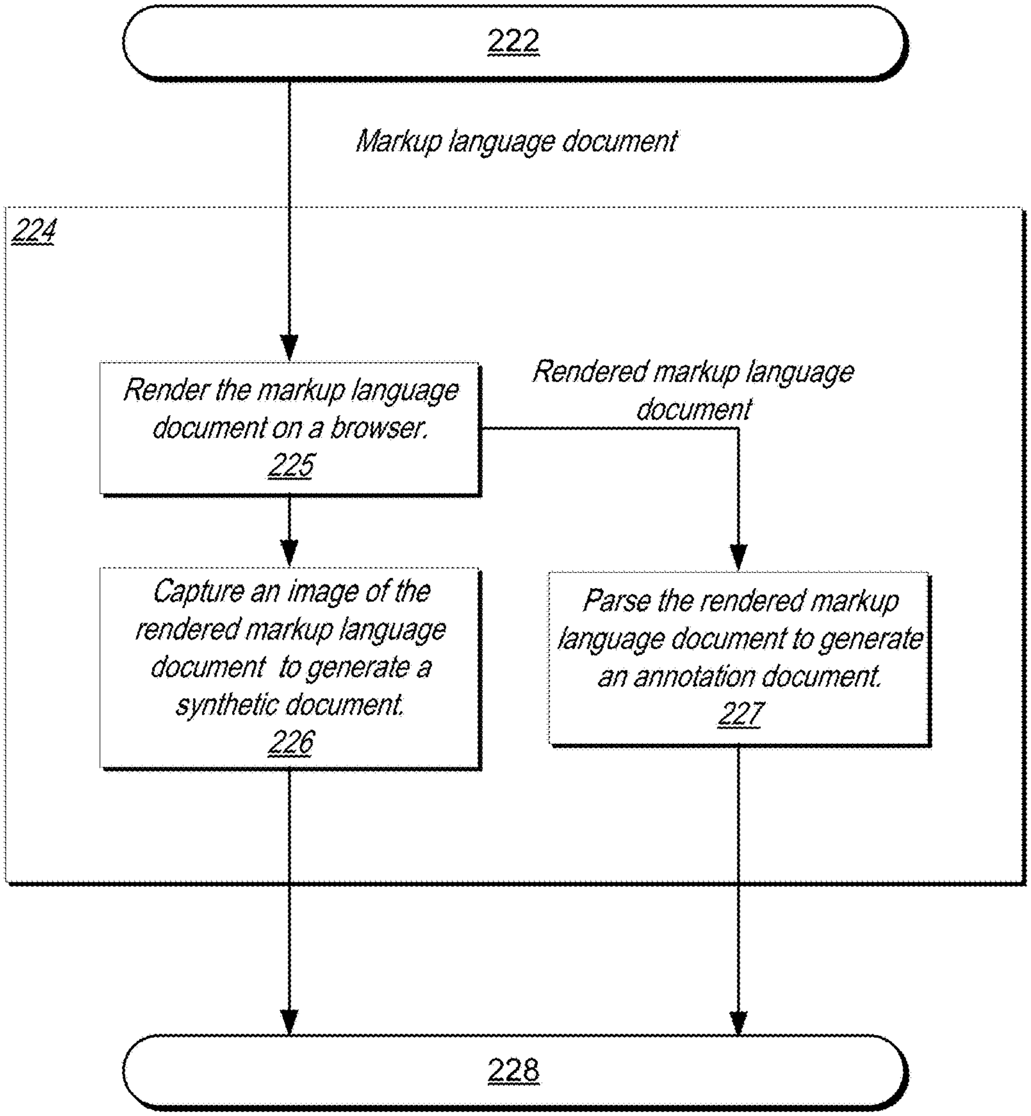

As indicated at 220, synthetic documents and corresponding annotation documents are generated based on the configuration. FIGS. 2B and 2C expand on element 220 of FIG. 1A. As indicated at 230, a machine learning model (e.g., a neural network) is trained with the synthetic documents and annotation documents. The machine learning model may then be used to analyze real-world documents.

As indicated at 240, in some embodiments, feedback from the machine learning model may be analyzed to determine if more training is needed. The feedback may indicate performance metrics for the machine learning model when analyzing real-world documents. The system may determine from the feedback that the machine learning model underperformed when classifying one or more elements or layouts in the real-world documents. For example, thresholds for success in classifying the elements or layouts may be specified, and if the performance metric for a given element or layout is below a specified threshold, then the machine learning model underperformed when classifying that element or layout. At 250, if the analysis of the feedback determines that the machine learning model needs additional training, then as indicated at 260 a new configuration may be generated based on the analysis of the feedback from the machine learning model. The new configuration may indicate (or increase the weights of) the one or more elements or layouts for which the neural network underperformed so that examples of those elements or layouts are included in new synthetic documents to further train the machine learning model for classifying those elements or layouts. The method returns to element 210 to generate a new set of synthetic and annotation documents based on the new configuration to further train the machine learning model.

FIG. 2B is a flowchart that expands on element 220 of FIG. 2A. As shown in FIG. 1A, in some embodiments, the configuration file may be passed to multiple instances of a synthetic document generator; each instance may be configured to perform element 220 as shown in FIG. 2B. As indicated at 222, a markup language document (e.g., an HTML document) is generated from the configuration file (e.g., a JSON file) using element templates from a repository as specified in the configuration file. The element templates in the markup language document may be populated with example content. Content, size, style, and location of the element templates in the markup language documents may be randomized to provide diversity in the synthetic documents. As indicated at 224, a synthetic document and an annotation document are generated from the markup language document. As indicated at 228, the synthetic document and the annotation document may be stored to a data store. As shown in FIG. 2B, in some embodiments, multiple instances of element 220 may be used to generate multiple, diverse synthetic documents and corresponding annotation documents.

FIG. 2C is a flowchart that expands on element 224 of FIG. 2C. As indicated at 225, the markup language document may be rendered on a browser. As indicated at 226, an image or screenshot of the rendered markup language document may be captured to generate the synthetic document. FIGS. 5A through 5D illustrate examples of synthetic documents 132. As indicated at 227, the rendered markup language document is parsed to generate an annotation document (e.g., a JSON file) for the synthetic document. Each annotation document includes information describing the respective synthetic document. For example, an annotation document may include information describing the element template type, location, size, style, and content of the elements in the synthetic document, and also may include information indicating associations between elements in the synthetic document (for example, which words are associated with a text element). FIGS. 6A and 6B illustrate an annotation document 142 for a text document, and FIGS. 7A through 7F illustrate an annotation document 142 for a form document.

FIG. 3 shows a portion of an example configuration file 330 for a form document, according to some embodiments, and is not intended to be limiting. Configuration file 330 may, for example, be a JSON file. In this example "componentWeights" lists components (or element template types) that are to be included in synthetic documents ("keyValuePair" and "checkbox"), and gives weights for the components. "keyValueStyles" indicates two styles of keyValuePair (i.e., two styles of element templates) that are to be used ("XformKeyAtTop" and "XformKeyAtBottom"), and gives weights for the styles. "Xform" may refer to a particular type of form from which the element templates were extracted. The configuration file may indicate other information regarding the layout and style of the synthetic document, such as indicating that the form is to be (or not to be) an Xform-like form, and indicating the number of sections in the form.

FIG. 4 show a portion of an example configuration file 430 for a text document, according to some embodiments, and is not intended to be limiting. Configuration file 430 may, for example, be a JSON file. In this example "textTypesAndWeights" lists several types of text (in this example, numeric symbols, letters, punctuation symbols, short words, long words, and regular words) that are to be included in the synthetic documents, and provides a weight for each type of text. The specified types will be distributed in the synthetic documents based on their respective weights.

FIGS. 5A through 5D show example synthetic documents that may be generated from configuration files, according to some embodiments, and are not intended to be limiting.

Figure 5A:
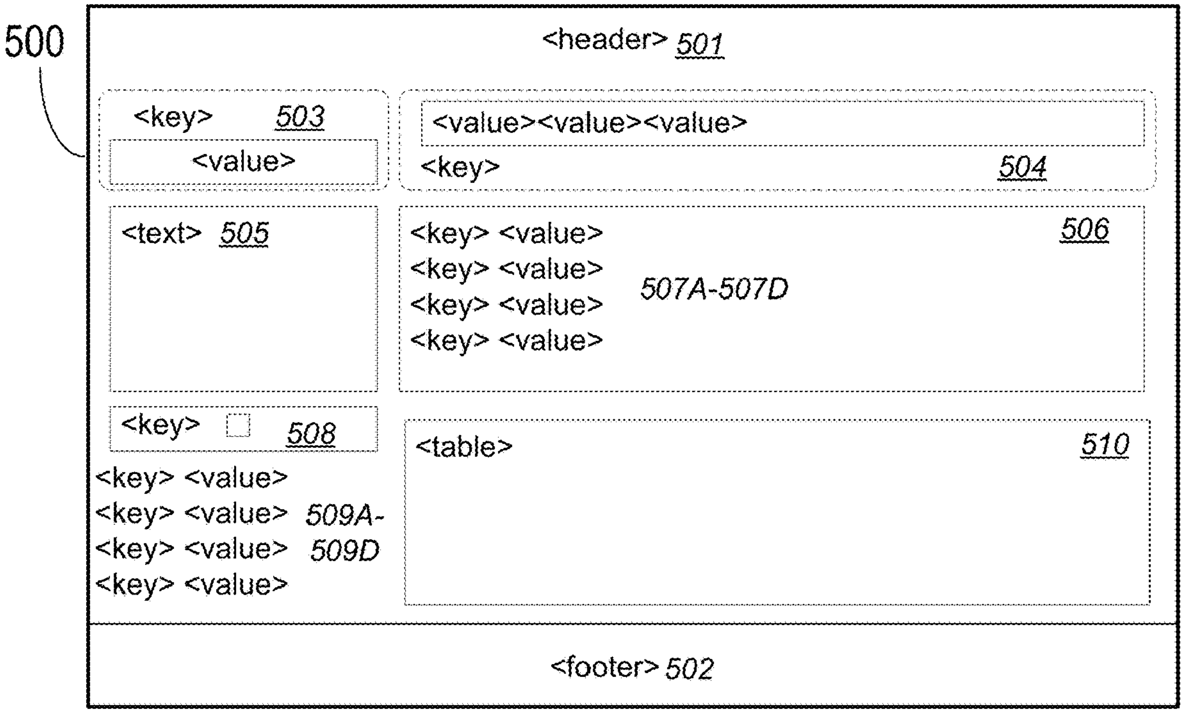

FIG. 5A shows an example form document 500. The document 500 may include a header 501 and a footer 502 that may, for example include text elements of various types, styles, and sizes. Text area or box 505 may, for example, include text elements (e.g. words, numbers, symbols, etc.) of various types, styles, and sizes. Table 510 represents a table that may, for example, include rows and columns of text, numbers, etc. 503 represents a single key-single value pair in which the key is above the value. 504 represents a single key-multiple value element in which the key is below the values. 506 shows a list of key-value pairs 507A-507D enclosed in a line box. Key-value pairs 509A-509D are not enclosed in a line box. 508 illustrates a key-clickable value element (e.g., a checkbox). Note that single key-single clickable value and/or single key-multiple clickable value elements may be present on a form.

The layout, style and content of the elements in form 500 may vary across the set of synthetic documents generated from the respective configuration file. The keys and values may include one or more text elements of various types, styles, and sizes (words, numbers, symbols, etc.). In particular, the keys and values may be randomized across the synthetic documents generated by the renderer instances. In some cases (i.e., in some of the synthetic documents generated by the renderer instances), one or more of the value fields (or in some cases other elements such as the text area 505) may be empty.

Figure 5B:
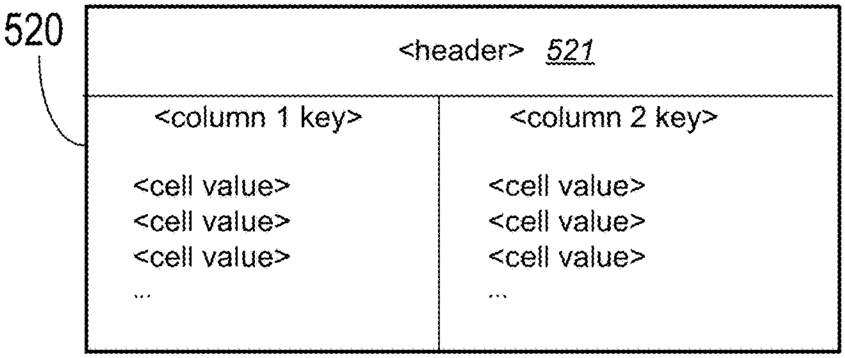

FIG. 5B shows an example document 520 with two columns of cell values. The document 520 may include a header 521 that may, for example include text elements of various types, styles, and sizes. In this example, there are two columns (column 1 and column 2). Each column includes a column header and n cells. Each column can be considered a type of single key-multiple value element in which the column header is the key for the column, and the cells are the values for the column.

The layout, style and content of the elements in the document 520 may vary across the set of synthetic documents generated from the respective configuration file. The column headers and cells may include one or more text elements of various types, styles, and sizes (words, numbers, symbols, etc.). In particular, the values in the cells may be randomized across the synthetic documents generated by the renderer instances.

Figure 5C:
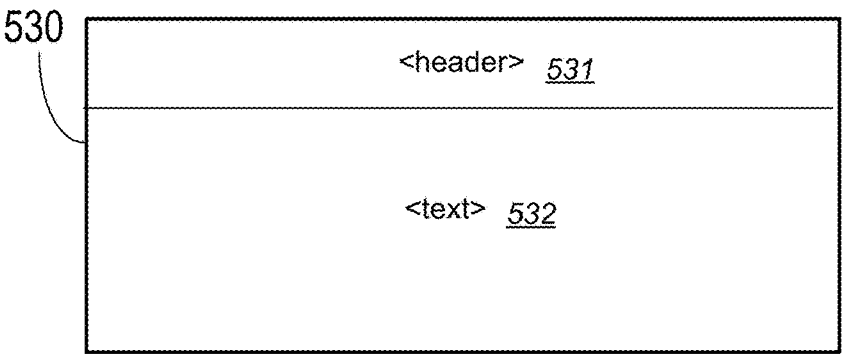

FIG. 5C shows an example text document 530. The document 530 may include a header 531 that may, for example include text elements of various types, styles, and sizes. Text area 532 may include lines of text elements (e.g. words, symbols, numbers, etc.) of various types, styles, and sizes. The layout of the text in text area 532 may be structured (e.g., columns, sections, paragraphs, etc.) or unstructured. The layout, style and content of the elements in the document 530 may vary across the set of synthetic documents generated from the respective configuration file.

FIG. 5D shows another, more complex example form document 540. The document 540 may include a header 541 and a footer 542 that may include text elements (e.g. words, numbers, symbols, etc.) of various types, styles, and sizes. The document may include two sections 550 and 570, each section including several elements. The section headers 550 and 570 may include text elements (e.g. words, numbers, symbols, etc.) of various types, styles, and sizes. Section 550 includes key-value elements 552A, 552B, 552C, and 552D and 554A, 554B, 554C, 554D, and 554E. Section 570 includes key-value elements 552E, 554F, 554G, 554H, and 554I and 556A, 556B, and 556C. The elements in each section may be enclosed in line boxes. Elements 552A-552E are single-key-single value elements. Elements 554A-554I are single key-multiple value elements. Elements 556A-556C are single key-multiple clickable value elements (e.g., checkboxes).

The layout, style and content of the elements in form 540 may vary across the set of synthetic documents generated from the respective configuration file. The keys and values may include one or more text elements of various types, styles, and sizes (words, numbers, symbols, etc.). In particular, the keys and values may be randomized across the synthetic documents generated by the renderer instances. In some cases (i.e., in some of the synthetic documents generated by the renderer instances), one or more of the value fields (or in some cases other elements such as the text area 505) may be empty.

FIGS. 6A-6B and 7A-7F provide non-limiting examples of annotation documents, according to some embodiments. As previously mentioned, the rendered markup language documents (e.g. annotated HTML documents) are parsed to generate annotation documents for respective synthetic documents. In some embodiments, the annotation documents may be JSON (JavaScript Object Notation) files. However, other methods may be used to specify annotation documents. Each annotation document includes information describing a respective synthetic document. For example, an annotation document may include information describing the element template type, location, size, style, and content of the elements in the respective synthetic document, and also may include information indicating associations and relationships between elements in the synthetic document (for example, which words are associated with a text element, which words are in a line, which words are in a key, which words are in a value, etc.). FIGS. 6A and 6B illustrate an annotation document for a text document such as document 530 illustrated in FIG. 5C, and FIGS. 7A through 7F illustrate an annotation document for a form document such as form 540 illustrated in FIG. 5D.

FIGS. 6A and 6B shows an example annotation document 600 for a dense text synthetic document such as document 530 illustrated in FIG. 5C, according to some embodiments, and are not intended to be limiting.

As shown in FIG. 6A, the annotation document 600 indicates that the respective synthetic document does not include tables or key-value pairs. Annotation document 600 includes a list of words that appear in the respective synthetic document. For each word, document 600 specifies a location and dimensions of a bounding box for the word in the synthetic document (<X,Y,W,H>), a bounding box identifier for the word, and the content, style, and transcription type of the word. Document 600 may also include a list of lines that appear in the respective synthetic document. For each line, document 600 specifies a location and dimensions of a bounding box for the line in the synthetic document (<X,Y,W,H>), a bounding box identifier for the line, and a list of word boxes (word bounding box identifiers) that are in the line.

As shown in FIG. 6B, the annotation document 600 indicates that the respective synthetic document does not include sections. Annotation document 600 may include a list of one or more text bodies in the synthetic document. For each text body, document 600 specifies a location and dimensions of a bounding box for the text body in the synthetic document (<X,Y,W,H>), a bounding box identifier for the text body, and a list of one or more word boxes (word bounding box identifiers) that are in the text body. Document 600 also specifies a list of child elements (as bounding box identifiers) of the text body, as well as the type of each child element (in this example, a word).

As shown in FIG. 6B, annotation document 600 may also include a list of one or more headers in the synthetic document. For each header, document 600 specifies a location and dimensions of a bounding box for the header in the synthetic document (<X,Y,W,H>), a bounding box identifier for the header, and a list of one or more word boxes (word bounding box identifiers) that are in the header. Document 600 also specifies a list of child elements (as bounding box identifiers) of the header, as well as the type of each child element (in this example, words). Also note that, since this is a dense text document, the form and form body sections of annotation document 600 are empty.

FIGS. 7A through 7F show an example annotation document 700 for a dense form synthetic document such as form 540 illustrated in FIG. 5D, according to some embodiments, and are not intended to be limiting.

As shown in FIG. 7A, the annotation document 700 indicates that the respective synthetic document does not include tables. Annotation document 700 includes a list of key-value elements that appear in the respective synthetic document. A first key-value element (key value element 1) shown in FIG. 7A is a single key-single value element. A second key-value element (key value element 2) shown in FIG. 7B is a single key-multiple value element. For each key-value element, document 700 specifies a key and one or more values. For the key, document 700 specifies a location and dimensions of a bounding box for the key in the synthetic document (<X,Y,W,H>), a bounding box identifier for the key, and one or more word boxes (word bounding box identifiers) that are in the key. For each value, document 700 specifies a location and dimensions of a bounding box for the value in the synthetic document (<X,Y,W,H>), a bounding box identifier for the value, and one or more word boxes (word bounding box identifiers) that are in the value. Document 700 also specifies a list of child elements (as bounding box identifiers) of the value, as well as the type of each child element (for example, a word). Document 700 also specifies the bounding box location and dimensions, bounding box identifier, and style (e.g., single key-single value, single key-multiple value, etc.) of a container for the key-value element.

As shown in FIG. 7C, annotation document 700 includes a list of words that appear in the respective synthetic document. For each word, document 700 specifies a location and dimensions of a bounding box for the word in the synthetic document (<X,Y,W,H>), a bounding box identifier for the word, and the content and transcription type of the word. Word 1 and word 2 are of type text, and the content of these words are strings. For words 1 and 2 of type text, the style of the word (font size, type, and color) are provided. Word 3 and word 4 are of type "clickable value", and the content of these words are Boolean values (TRUE or FALSE).

As shown in FIG. 7D, document 700 may also include a list of lines that appear in the respective synthetic document. For each line, document 700 specifies a location and dimensions of a bounding box for the line in the synthetic document (<X,Y,W,H>), a bounding box identifier for the line, and a list of word boxes (word bounding box identifiers) that are in the line.

As shown in FIG. 7D, document 700 may also include a list of sections that appear in the respective synthetic document. For each section, document 700 specifies a location and dimensions of a bounding box for the section in the synthetic document (<X,Y,W,H>) and a bounding box identifier for the section. Document 700 also specifies a location and dimensions of a bounding box for the section header in the synthetic document (<X,Y,W,H>) and a bounding box identifier for the section header. Document 700 also specifies a location and dimensions of a bounding box for the section body in the synthetic document (<X,Y,W,H>), a bounding box identifier for the section body, and lists of words and children associated with the section body (in this example, both empty).

As shown in FIG. 7E, annotation document 700 may include a list of one or more text bodies in the synthetic document. For each text body, document 700 specifies a location and dimensions of a bounding box for the text body in the synthetic document (<X,Y,W,H>), a bounding box identifier for the text body, and a list of one or more word boxes (word bounding box identifiers) that are in the text body. Document 700 also specifies a list of child elements (as bounding box identifiers) of the text body, as well as the type of each child element (in this example, a word).

As shown in FIG. 7E, annotation document 700 may also include a list of one or more headers in the synthetic document. For each header, document 700 specifies a location and dimensions of a bounding box for the header in the synthetic document (<X,Y,W,H>), a bounding box identifier for the header, and a list of one or more word boxes (word bounding box identifiers) that are in the header. Document 700 also specifies a list of child elements (as bounding box identifiers) of the header, as well as the type of each child element (in this example, words).

As shown in FIG. 7F, annotation document 700 may also specify a form for the synthetic document. Document 700 specifies a location and dimensions of a bounding box for the form in the synthetic document (<X,Y,W,H>), a bounding box identifier for the form, and a list of one or more word boxes (word bounding box identifiers) that are in the form (in this example, empty). Document 700 also specifies a list of child elements (as bounding box identifiers) of the form, as well as the type of each child element (in this example, FORM BODY, SECTION, and HEADER).

As shown in FIG. 7F, annotation document 700 may also specify a form body for the synthetic document. Document 700 specifies a location and dimensions of a bounding box for the form body in the synthetic document (<X,Y,W,H>), a bounding box identifier for the form body, and a list of one or more word boxes (word bounding box identifiers) that are in the form (in this example, empty). Document 700 also specifies a list of child elements (as bounding box identifiers) of the header, as well as the type of each child element (in this example, SECTION).

FIG. 8 illustrates an example cloud-based system for generating multiple synthetic documents, according to some embodiments. As previously mentioned, embodiments of a synthetic document generation system as described herein may be implemented as a service on a provider network. FIG. 8 shows an example architecture for an embodiment of a synthetic document generation service on a provider network 880, and is not intended to be limiting.

As shown in FIG. 8, a configuration specification 802 may be submitted to a batch scheduler 800. Batch scheduler 800 may, for example, be implemented as a service of the provider network 880 that provides an application programming interface (API) via which jobs may be submitted for deployment to and execution as multi-node jobs in the cloud-based computing environment provided by the provider network 880. Generating a set of synthetic documents based on the configuration specification may be considered a "job" to be managed and scheduled by batch scheduler 800. Configuration specification 802 may, for example, specify a particular configuration file (e.g., stored in conversation data store 810) for which synthetic documents are to be generated (for example, as a URL), and the number n (e.g., 1000) of synthetic documents to be generated. In response to the configuration specification 802, the batch scheduler 800 may cause n instances of virtual machines (VMs) 820 or containers (e.g., DOCKER containers) on the provider network 880 to be allocated and configured as nodes (e.g., node 820A, node 820B, node 820*n*) to execute the job; each node may implement a "headless" browser (e.g., headless browser 822A, headless browser 822B, headless browser 822*n*). A headless browser is a web browser without a graphical user interface. The batch scheduler 800 passes an indication of the specified configuration file to each node; the headless browser on each node then communicates with synthetic document generator 830, implemented by one or more devices on provider network 880, to generate a synthetic document and respective annotation document. Thus, the n nodes generate n synthetic documents and n corresponding annotation documents.

As an example, headless browser 822B on node 820B accesses a private endpoint of synthetic document generator 830, and provides the configuration file indicator to the generator 830. Synthetic document generator 830 obtains the configuration file from configuration data store 810 on provider network 880, and based on the configuration file generates a markup language file (e.g., an HTML file) that includes weighted element templates from repository 770 on provider network 880, with randomized content, styles, layouts, etc. Headless browser 822B then renders the markup language file. An image of the rendered markup language file is captured to generate synthetic document 832B, and the rendered markup language file is parsed to generate annotation document 842B. The synthetic and annotation documents may be stored to a synthetic document data store 860 on provider network 880.

FIG. 9 illustrates an example cloud-based document analysis system, according to some embodiments. Embodiments of the synthetic document generation system may, for example, be implemented as a service 900 on a provider network 980. A document analysis service 920 may also be provided on the provider network to analyze real-world documents such as forms, receipts, and dense text documents using machine learning models 932 (e.g., neural networks) to generate digital and semantic information for the documents. The machine learning models 932 may be implemented by a machine learning service 930 on the provider network 980. The machine learning models 932 may be trained at least in part using synthetic documents and annotation documents generated by the synthetic document generation service 900 as training data.

Client(s) 990 may provide real-world documents (e.g., as images, PDF files, etc.) to the document analysis service 920 via an application programming interface (API) 922. Document analysis service 920 may provide the real-world documents to machine learning service 930 to be analyzed using a machine learning model 932. Results of the analysis may be passed back to the document analysis service 920, which may provide digitized documents and semantic data for the documents.

Configurations based on analysis of real-world documents may be provided to the synthetic document generation service 900 to generate training data (synthetic and annotation documents) for training the machine learning model

932. While FIG. 9 shows the configuration coming from document analysis service 920, configurations may be received from other sources.

In addition, in some embodiments, feedback from the machine learning model 932 (e.g., a neural network) can be automatically or manually analyzed to determine features or elements of real-world documents that the model 932 performs poorly on. From this analysis, new configurations can be generated to generate additional synthetic training data that includes new synthetic and annotation documents to further train the model 932 on the features or elements of real-world documents where the model underperforms. This process can be repeated to fine tune the machine learning model 932 to perform better when analyzing real-world documents.

Example Provider Network Environment

This section describes example provider network environments in which embodiments of the methods and apparatus described in reference to FIGS. 1 through 9 may be implemented. However, these example provider network environments are not intended to be limiting.

FIG. 10 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A, 4050B, or 4050*c*) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A of one or more client devices 4052 may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 11:
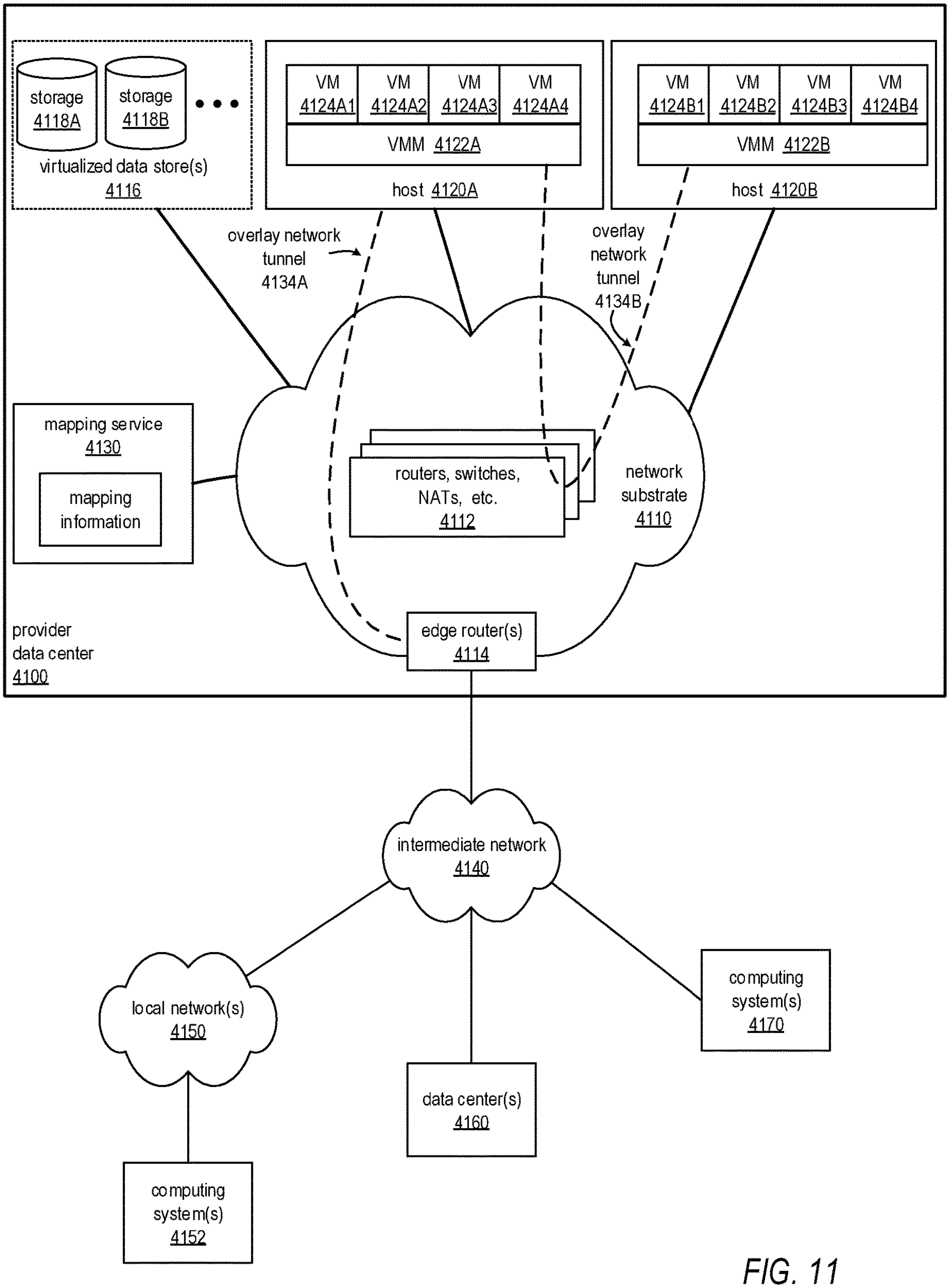
FIG. 11 illustrates an example data center that implements an overlay network on a network substrate using IP tunneling technology, according to some embodiments.

FIG. 11 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 11) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 11, an example overlay network tunnel 4134A from a virtual machine (VM) on host 4120A to a device on the local network 4150 and an example overlay network tunnel 4134B between a VM on host 4120B and a VM on host 4120A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 11, at least some networks in which embodiments may be implemented may include hardware virtualization technology that enables multiple operating systems to run concurrently on a host computer (e.g., hosts 4120A and 4120B of FIG. 11), i.e. as virtual machines (VMs) (e.g., VM 4124A1, VM 4124A2, VM 4124A3, VM 4124A4, VM 4124B1, VM 4124B2, VM 4124B3, VM 4124B4) on the hosts (e.g., 4120A, 4120B). The VMs may, for example, be executed in slots on the hosts that are rented or leased to clients of a network provider. A hypervisor, or virtual machine monitor (VMM) (e.g., VMM 4122A, VMM 4122B), on a host presents the VMs on the host with a virtual platform and monitors the execution of the VMs. Each VM may be provided with one or more private IP addresses; the VMM on a host 4120 may be aware of the private IP addresses of the VMs on the host. A mapping service 4130 may be aware of all network IP prefixes and the IP addresses of routers or other devices serving IP addresses on the local network. This includes the IP addresses of the VMMs serving multiple VMs. The mapping service 4130 may be centralized, for example on a server system, or alternatively may be distributed among two or more server systems or other devices on the network. A network may, for example, use the mapping service technology and IP tunneling technology to, for example, route data packets between VMs on different hosts within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs to Internet destinations, and from Internet sources to the VMs. Note that an external gateway protocol (EGP) or border gateway protocol (BGP) is typically used for Internet routing between sources and destinations on the Internet. FIG. 11 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs) via a hardware virtualization service and the ability to implement virtualized data stores 4116 on storage resources (e.g., 4118A, 4118B) via a storage virtualization service.

The data center 4100 network may implement IP tunneling technology, mapping service technology, and a routing service technology to route traffic to and from virtualized resources, for example to route packets from the VMs on hosts in data center 4100 to Internet destinations, and from Internet sources to the VMs. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM on a host 4120 in data center 4100 to other VMs on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM on a host in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources, as virtualized resources to clients of a network provider in a similar manner.

In some embodiments, instead of or in addition to providing hardware virtualization technology that enables multiple operating systems to run concurrently on host computers as virtual machines (VMs) on the hosts, container technology may be leveraged to provide containers to clients of the network provider. Container technology is a virtualization technology that allows applications to be developed as containers that can be deployed to and executed in container-based virtualization environments provided by container platforms on host machines, for example on one or more hosts 4120 in a provider data center 4100. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple containers to run on a single OS instance. A primary difference between containers and VMs is that containers provide a way to virtualize an OS in order for multiple workloads to run on a single OS instance, whereas with VMs, the hardware is virtualized to run multiple OS instances.

Figure 12:
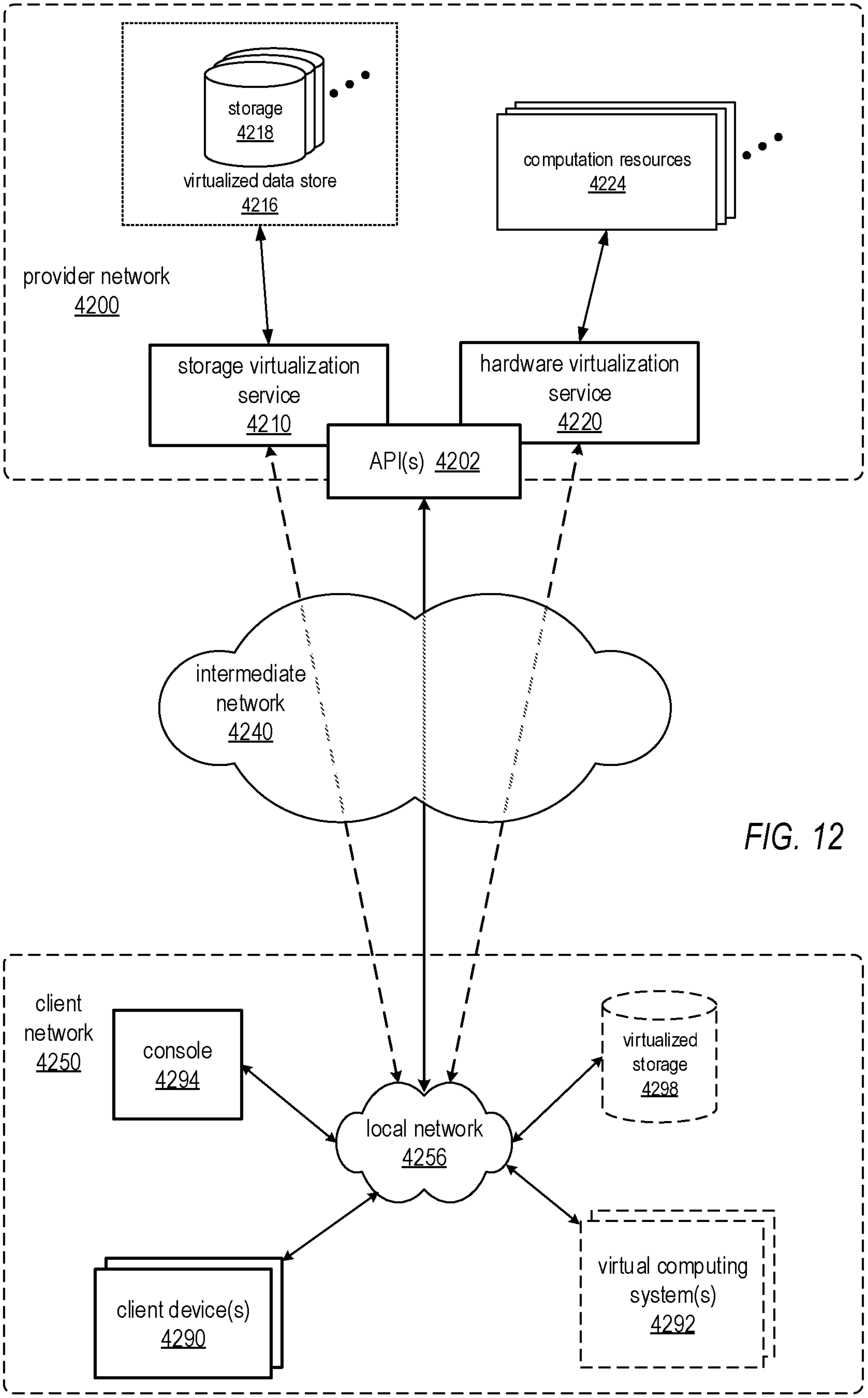
FIG. 12 is a block diagram of an example provider network that provides a storage virtualization service and a hardware virtualization service to clients, according to some embodiments.

FIG. 12 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 12, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 13:
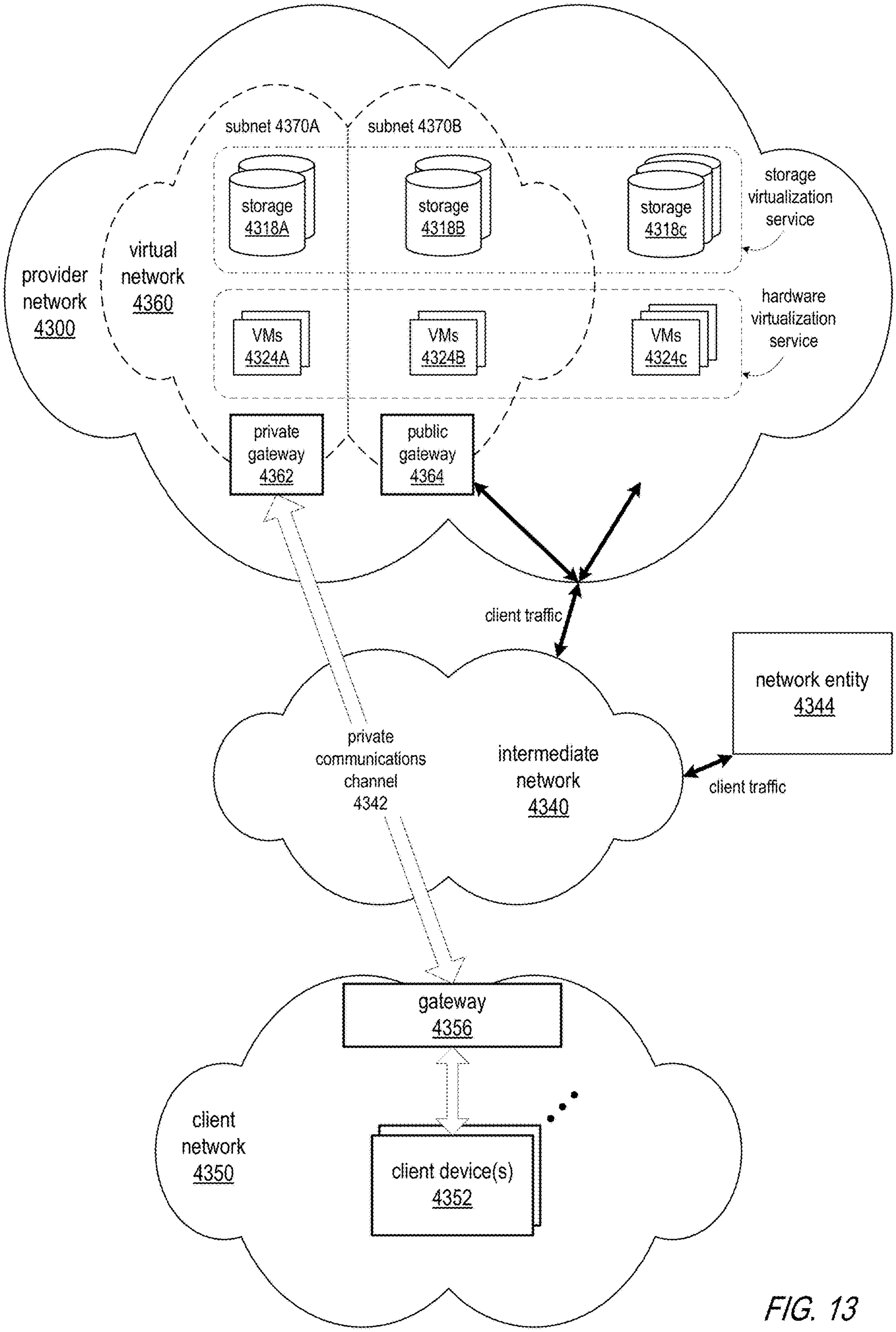
FIG. 13 illustrates an example provider network that provides virtual networks to at least some clients, according to some embodiments.

FIG. 13 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 13 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 13 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 14:
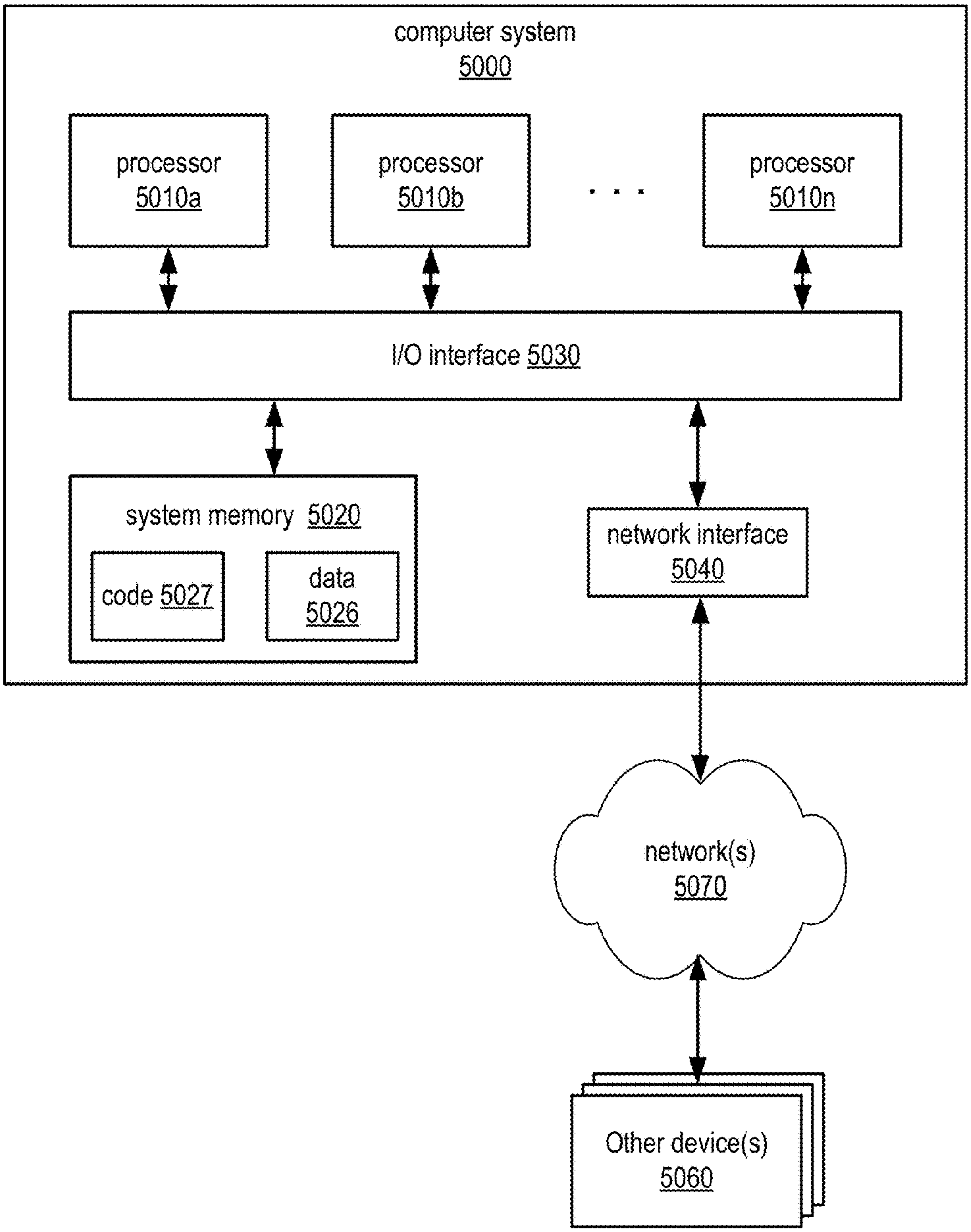
FIG. 14 is a block diagram illustrating an example computer system that may be used in some embodiments.

In some embodiments, a system that implements a portion or all of the methods and apparatus for providing a synthetic document generation system as described herein may include a general-purpose computer system that includes or is configured to access one or more computer-accessible media, such as computer system 5000 illustrated in FIG. 14. In the illustrated embodiment, computer system 5000 includes one or more processors (e.g., 5010*a*, 5010*b*, 5010*n*) coupled to a system memory 5020 via an input/output (I/O) interface 5030. Computer system 5000 further includes a network interface 5040 coupled to I/O interface 5030. While FIG. 14 shows computer system 5000 as a single computing device, in various embodiments a computer system 5000 may include one computing device or any number of computing devices configured to work together as a single computer system 5000.

In various embodiments, computer system 5000 may be a uniprocessor system including one processor, or a multiprocessor system including several processors (e.g., two, four, eight, or another suitable number). Processors may be any suitable processors capable of executing instructions. For example, in various embodiments, processors may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s). In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5027 and data 5026.

In one embodiment, I/O interface 5030 may be configured to coordinate I/O traffic between processor, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010*a*). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into a processor.

Network interface 5040 may be configured to allow data to be exchanged between computer system 5000 and other devices 5060 attached to a network or networks 5070, such as other computer systems or devices as illustrated in FIGS. 1 through 13, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 9 for providing a synthetic document generation system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g.

SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more synthetic document generation instances implemented by one or more devices on a network; and a controller implemented by one or more devices on the network and configured to:

receive a configuration for generating synthetic documents derived from real-world documents, wherein the configuration specifies element templates in a repository to be included in the synthetic documents and weights for distributing the specified elements in the synthetic documents, wherein the repository stores reusable element templates derived from a set of real-world documents; and provide the configuration for the synthetic documents to the one or more synthetic document generation instances;

wherein the one or more synthetic document generation instances are configured to:

generate markup language documents based on the configuration, wherein the markup language documents include diversified instances of the element templates from the repository as indicated in the configuration;

render the markup language documents;

capture images of the rendered markup language documents to generate synthetic documents; and parse the rendered markup language documents to generate annotation documents for the synthetic documents, wherein each annotation document includes information describing respective synthetic document;

wherein the synthetic documents and the annotation documents are configured to be used to train a machine learning model to analyze real-world documents.

2. The system as recited in claim 1, wherein the configuration is a JavaScript Object Notation (JSON) file, the markup language documents are Hypertext Markup Language (HTML) files, and the annotation documents are JSON files.

3. The system as recited in claim 1, wherein each synthetic document generation instance includes a browser instance, and wherein the markup language documents are rendered by the browser instances.

4. The system as recited in claim 1, wherein, to generate the markup language documents based on the configuration, the one or more synthetic document generation instances are configured to:

obtain the element templates indicated in the configuration from the repository;

create the instances of the element templates in the markup language document;

and populate the instances of the element templates in the markup language document.

5. The system as recited in claim 1, wherein the controller is further configured to:

obtain a new configuration based on feedback from the machine learning model, wherein the feedback indicates performance metrics for the machine learning model when analyzing real-world documents, and wherein the new configuration includes indications of example templates in the repository that correspond to one or more elements in the real-world documents for which the machine learning model underperformed; and provide the new configuration to the one or more synthetic document generation instances wherein the one or more synthetic document generation instances are configured to generate additional synthetic documents and respective annotation documents for further training of the machine learning model according to the new configuration.

6. A method, comprising:

performing, by a service implemented by one or more devices on a network:

receiving a configuration for synthetic documents derived from real-world documents, wherein the configuration includes indications of element templates in a repository to be included in the synthetic documents and weights for the indicated element templates, wherein the repository stores reusable element templates derived from a set of real-world documents;

generating a plurality of synthetic documents based on the configuration, wherein the synthetic documents include diversified instances of the element templates from the repository as indicated in the configuration;

generating annotation documents for the synthetic documents, wherein each annotation document includes information describing a respective synthetic document; and training a machine learning model using the synthetic documents and the annotation documents.

7. The method as recited in claim 6, wherein the configuration further includes indications of element types, styles, and layouts for the element templates in the synthetic documents.

8. The method as recited in claim 6, wherein the configuration is a JavaScript Object Notation (JSON) file.

9. The method as recited in claim 6, wherein generating a plurality of synthetic documents based on the configuration comprises, for each synthetic document to be generated:

generating a markup language document based on the configuration, wherein the markup language document includes instances of the element templates as indicated in the configuration;

rendering the markup language document; and capturing an image of the rendered markup language document to generate the synthetic document.

10. The method as recited in claim 9, wherein the markup language document is a Hypertext Markup Language (HTML) file, and each annotation document is a JavaScript Object Notation (JSON) file.

11. The method as recited in claim 9, wherein for each synthetic document, generating the annotation document comprises parsing the rendered markup language document to obtain annotation information for the synthetic document and writing the annotation information to the annotation document.

12. The method as recited in claim 9, wherein rendering the markup language document comprises rendering the markup language document in a browser application.

13. The method as recited in claim 9, wherein generating a markup language document based on the configuration comprises:

obtaining the element templates indicated in the configuration from the repository;

generating the instances of the element templates in the markup language document; and populating the instances of the element templates in the markup language document with example content.

14. The method as recited in claim 6, further comprising:

obtaining feedback indicating performance metrics for the machine learning model when analyzing the real-world documents;

determining from the feedback one or more elements in the real-world documents for which the machine learning model underperformed; and generating a new configuration that includes indications of example templates in the repository that correspond to the one or more elements in the real-world documents for which the machine learning model underperformed.

15. The method as recited in claim 14, further comprising:

generating additional synthetic documents according to the new configuration;

generating annotation documents for the additional synthetic documents; and performing additional training of the machine learning model using the additional synthetic documents and the respective annotation documents.

16. The method as recited in claim 6, wherein the element templates indicated in the configuration include one or more of key-value elements, text elements, numeric elements, tables, columns, checkboxes, headers, or footers.

17. A non-transitory computer-accessible storage medium storing program instructions that when executed on a computing device cause the computing device to:

receive a configuration for generating synthetic documents derived from real-world documents, wherein the configuration specifies element templates in a repository to be included in the synthetic documents and weights for distributing the specified elements in the synthetic documents, wherein the repository stores reusable element templates derived from a set of real-world documents;

generate a plurality of synthetic documents based on the configuration, wherein the synthetic documents include diversified instances of the element templates from the repository as indicated in the configuration;

generate annotation documents for the synthetic documents, wherein each annotation document includes information describing a respective synthetic document; and store the generated synthetic documents and the respective annotation documents to a document data store.

18. The non-transitory computer-accessible storage medium as recited in claim 17, wherein, to generate the plurality of synthetic documents, the program instructions when executed on the computing device further cause the computing device to:

generate markup language documents based on the configuration, wherein the markup language documents include diversified instances of the element templates specified in the configuration;

render the markup language documents;

capture images of the rendered markup language documents to generate the synthetic documents.

19. The non-transitory computer-accessible storage medium as recited in claim 18, wherein, to generate the markup language documents based on the configuration, the program instructions when executed on the computing device further cause the computing device to:

obtain the element templates indicated in the configuration from the repository;

create the instances of the element templates in the markup language document;

and populate the instances of the element templates in the markup language document with example content.

20. The non-transitory computer-accessible storage medium as recited in claim 17, wherein the synthetic documents and the annotation documents are configured to be used to train a machine learning model to analyze real-world documents, and wherein the program instructions when executed on the computing device further cause the computing device to:

obtain a new configuration based on feedback from the machine learning model;

and generate additional synthetic documents and annotation documents based on the new configuration.

* * * * *